(12) United States Patent
Vela García et al.

(10) Patent No.: US 11,546,069 B2
(45) Date of Patent: Jan. 3, 2023

(54) DOUBLY SELECTIVE CHANNEL EMULATOR, STATIONARY OR NON-STATIONARY IN TIME, WITH NON-SEPARABLE SCATTERING FUNCTION

(71) Applicant: CENTRO DE INVESTIGACION Y DE ESTUDIOS AVANZADOS, Mexico City (MX)

(72) Inventors: Luis René Vela García, Zapopan (MX); Ramón Parra Michael, Zapopan (MX); Javier Vázquez Castillo, Chetumal (MX)

(73) Assignee: Centro De Investigation Y De Estudios Avanzados Del Instituto Politecnico Nacional, Mexico D.F. (MX)

( * ) Notice: Subject to any disclaimer, the term of this patent is extended or adjusted under 35 U.S.C. 154(b) by 0 days.

(21) Appl. No.: 16/956,577

(22) PCT Filed: Dec. 14, 2018

(86) PCT No.: PCT/MX2018/000149
§ 371 (c)(1),
(2) Date: Jun. 20, 2020

(87) PCT Pub. No.: WO2019/125124
PCT Pub. Date: Jun. 27, 2019

(65) Prior Publication Data
US 2021/0167879 A1 Jun. 3, 2021

(30) Foreign Application Priority Data
Dec. 20, 2017 (MX) .................. MX/A/2017/016952

(51) Int. Cl.
*H04B 17/391* (2015.01)

(52) U.S. Cl.
CPC ............................... *H04B 17/3912* (2015.01)

(58) Field of Classification Search
CPC .................................................... H04B 17/3912
USPC ......................................................... 370/241
See application file for complete search history.

(56) References Cited

U.S. PATENT DOCUMENTS

2006/0148429 A1* 7/2006 Inogai ................ H04B 17/0087
455/115.1

* cited by examiner

*Primary Examiner* — Natasha W Cosme
(74) *Attorney, Agent, or Firm* — Andrew C. Aitken; IP Law Leaders PLLC

(57) ABSTRACT

The present development details a method and apparatus for performing channel emulation of doubly selective scenarios, where the simulation and emulation duration is arbitrarily long for a stationary or non-stationary channel, with non-separable dispersion which is achieved by combining the techniques of channel orthogonalization, decomposition of the correlation tensor in the Doppler domain into frequency-dependent correlation matrices, followed by a matrix factorization of each of the mentioned matrices and, finally, the use of the windowing method to generate arbitrarily long achievements which thereby allows the concatenation of channel realizations coming from the same or different NSSF, thus achieving reproduction of stationary or non-stationary channels, respectively.

3 Claims, 21 Drawing Sheets

DPSD

DOUBLY SELECTIVE CHANNEL EMULATOR, STATIONARY OR NON-STATIONARY IN TIME, WITH NON-SEPARABLE SCATTERING FUNCTION

FIELD OF THE INVENTION

This patent is related to the telecommunications field; specifically, to the implementation of doubly dispersive wideband channel emulators to test systems or devices of wireless communication. The channel emulators/simulators developed using the technique presented in this patent can reproduce non-stationary channels, where the channel variability allows to assume stationarity in the channel statistics in a short period of time, and where the function of dispersion can be either separable as non-separable.

The constant pursuit of improvement in the communication's data schemes due to the rather increasing and massive demand of voice, data, and video services by the users, exposes the need of having devices capable of doing the evaluation and validation of these new communication systems' performance, with the purpose of its early launch to the market. The measurement equipment required in the design of these new wireless systems are the channel emulators/simulators, which seek to emulate/simulate real propagation conditions in a channel of communication. The term simulate corresponds to its implementation in program technology also known as software, whilst emulate does to its implementation in physical technologies, also known hardware.

The objective of the channel simulators/emulators is reproducing propagation environments with temporal, frequency and/or space selectivity, proving that they can introduce distortions with great level of exactitude and which statistical behavior is determined by predefined functions of the communication channel. That is, they generate additive noise and multiplicative noise which are characterized by stochastic processes of a given correlation. For the multiplicative noise case, the user's predefined correlation or the one measured in field, will depend on the distribution of angle of the arrival rays and departure rays, that are located on the transmitter and receptor directly associated to a determined propagation environment or power spectral density.

BACKGROUND OF THE INVENTION

It is well known that the radio cannel presents and environment with propagation conditions by multipath, which causes the transmitted signal to suffer dispersions, delays and attenuations [REF1]; which within the mobility conditions, causes the viewed signal in the receptor to suffer distortions such as the inter-symbolic interference and the frequency dispersion due to the Doppler effect [REF2]. In basis of the previous arguments, a cannel with propagation conditions in which the time of delay dispersion manages to distort the transmitted signal, is known as a Wideband Channel. A way to mathematically represent a signal of interest that suffers from different phenomena of distortion is shown below:

$$r(t) = \int_{-\infty}^{\infty} C_{bb}(t;\tau)u(t-\tau)d\tau, \quad \text{(I)}$$

where u(t) is the signal of interest to transmit and which will be affected by a radio channel in its band representation expressed by $C_{bb}(t;\tau)$; therefore, the receptor, obtains the distort signal r(t).

Nowadays, different models and channel simulators have been proposed to generate time varying impulse responses $C_{bb}(t;\tau)$, with the purpose of reproducing distortion phenomena as seen in a real radio channel. The previously mentioned emulators/simulators reproduce the channel statistics of communication considering them as stationary throughout the whole simulation. Nonetheless, knowing that a real channel is non-stationary, and, therefore, its statistics vary at all times, current channel simulators and emulators cannot reproduce the changing nature of the propagation environments.

When it comes to the dispersion seen in the temporal domain due to the multipath propagation, the channel simulators/emulators have as an objective to statistically reproduce the temporary dispersion found on the real channels, which is based on the received power distribution of the signal as a function of the propagation delay, defined as the Power Delay Profile (PDP).

On the other hand, when it comes to the dispersion on the frequency domain due to the relative mobility of the transmitter receptor and/or scattering objects, the channel simulators/emulators have as an objective, in the same way, to statistically reproduce the power distribution of the signal in function of the frequency shift caused by the Doppler effect. The given distribution is known as the Doppler Power Spectrum Density (DPSD).

As follows, the channel realizations generated by a wideband channel simulator or wideband emulator, being considered as doubly dispersive, have as an objective to reproduce the statistic values of the channel, represented by the channel dispersion function S(v,τ), which can be expressed as shown below:

$$S(v, \tau) = \sum_{m=0}^{M-1} S_m(v)\delta(\tau - \gamma_m) \quad \text{(II)}$$

where v is the dispersion on the Doppler domain, τ is the dispersion on the time delay domain, M is the number of important delays, which are characterized for having a significant power on the receptor, and $S_m(v)$ is the DPSD function associated to the al m-th significant delay.

The wideband channels that allow to express their dispersion function in a separable way by the multiplication of two independent density functions, the PDP denoted as P(τ), and the DPSD; these dispersion functions are known as Separable Scattering Functions (SSF), as shown below:

$$S(v,\tau) = P(\tau)S(v), \quad \text{(III)}$$

this means that in each delay value τ the same DPSD S(v) can be observed, only with a different mean value in power.

Likewise, the doubly selective channels, which have a non-separable dispersion function, describe in conjunction the density of the mean power value, observed for a determined value of time of delay and Doppler frequency, where the previous equation (III) is not valid. A NSSF cannot be represented as the external product of two functions PDP and DPSD, therefore, represents more of a real channel.

Hence, the utility and versatility of channel simulators/emulators is linked to the type of dispersion function that they are capable of reproducing, being preferred the ones that are capable of reproducing channels with NSSF, due to its approximation to the real channels. On the other side, it can be noticed that these dispersion functions, in real channels, can be non-stationary, i.e., the NSSF could be changing in time. This problem must also be considered if it is desired to count on emulators that produce similar statistics as the ones found in real channels.

Opposed to the ideas mentioned on the previous paragraph, current implementations and commercial devices of channel emulators, are nowadays based only on channel simulation methods with SSF, that consider the channel as stationary. This limited approximation, as has been mentioned before, does not allow to simulate real channels due to the statistics it can reproduce, which are the same in each value of time delay $\tau$ and during the whole time of simulation, therefore, they can only reproduce propagation environments with SSF in a stationary mode.

The channel simulators with existing SSF in the literature can be grouped in three main categories: the ones based on the reduction of the number of physical trajectories (implementation of both, trajectories and schemes of trajectory integration), model of the system and the ones based on the non-physical trajectories also known as virtual.

The simulators based on the direct implementation of trajectories and integration of physical trajectories, use the representation of the channel as the addition of complex sinusoidal functions. The selection of a type of dispersion function is achieved by the parameterization of the amplitude, phase and frequency, of each sinusoidal considered. This method is known as the Sum of Sinusoids (SOS) and Sum of Complex sinusoids (SOC). The main references of these methods are found in [REF3], [REF4] and [REF5].

The second division of simulators contains those who conceptualize the channel as a system, where the existent relationship between the input and output of itself is analyzed. This system can be represented by any stochastic filter that is both linear and variant in time, that can produce channels based on preferred statistics. There are several techniques to obtain the coefficients of the stochastic filter, for instance, [REF6] for filters type ARMA, [REF7] for filters type FIR.

The third type of simulator contains the approximations that conceptualize the propagation channel as a group of non-physical trajectories, and uses a set of orthogonal functions as a basis to expand performances of channel in a determined domain such as the space, frequency or time of delay. This method can use different types of base functions, for example: polynomial [REF1], orthogonal functions obtained from the eigen-decomposition of the autocorrelation function [REF8], wavelets [REF9], and modified Prolate functions [REF10] and Prolates [REF11], among others.

On the other hand, when it comes to reproducing a more realistic environment for propagation channels with NSSF, there is no implementation or device that is as successful in the mentioned characteristic. However, Hoeher in [REF4] presents a simulation method based on the Montecarlo realization of sinusoidal functions with different frequency Doppler parameters and delay, but incapable of considering non-stationary channels, an whose achieved statistics for the NSSF objective are very poor.

This patent presents a new communication channel simulation/emulation method and apparatus to generate channel realizations with NSSF where the statistics are stationary or non-stationary, where for both cases, the emulations is achieved from time intervals where the statistics are stationary. The new method achieves the generation of a doubly dispersive channel with stationary NSSF over a period of time, by representing the delay time domain in a subspace expanded by a set of orthogonal functions, in which their weights are the correlated stochastic processes; therefore, it can be considered as related adaptations in the Doppler frequency domain, it can also be an independent decomposition for each Doppler frequency. Therefore, the resulting simulator/emulator can be determined in terms of representation in the time domain by means of a sum of sinusoids, the same as its respective base function in the time delay domain, where the values of the parameters the sinusoids have captured the temporal-space correlation. Finally, the adequate concatenation of independent sequences of realizations of the doubly dispersive channel is considered, it is possible to form a doubly dispersive non-stationary channel from NSSF functions.

DETAILED DESCRIPTION OF THE INVENTION

Orthogonalization of the Communication Channel

Figure 1:
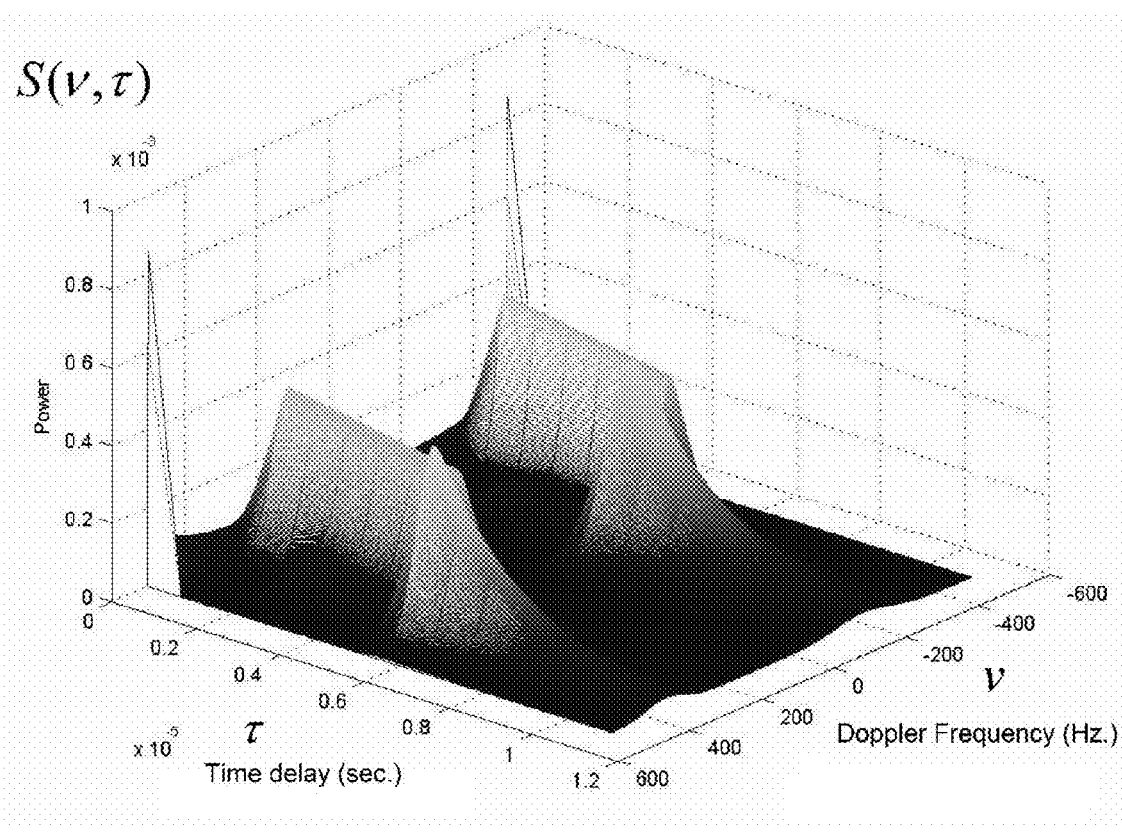
FIG. 1 shows an example of a NSSF, where it can be observed that the profile of power is different for each Doppler frequency value v.

A communication channel given by a real environment of propagation by multi-path results in a behavior which statistics are non-stationary and doubly dispersive, i.e., the dispersion in the time delay and Doppler frequency domain. Therefore, the channel simulators and emulators to design, must be parameterized from scattering functions, both, separable (SSF) and non-separable (NSSF), at the same time they must be robust enough to be able to approximate the variability or the non-stationarity of the channel. For the case of a non-stationary channel, the variability of the channel dispersion or the non-stationarity in the statistics of the channel dispersion can be brought nearby as a concatenation of functions of stationary dispersions.

Therefore, the complexity of a channel simulator/emulator will depend on the dimensionality of the model as well as it will depend on the maximum values of the maximum Doppler frequency $f_{Dmax}$ and maximum delay $\tau_{max}$. Thus, if M is considered as the relevant physical discrete trajectories, (which M quantity could tend to infinite), then the channel model in its base band version is described as following:

$$c_{bb}(t;\tau) = \sum_{m=0}^{M-1} \mu_m(t)\delta(\tau - \gamma_m), \qquad (IV)$$

where $\mu_m(t)$ corresponds to a stochastic process associated to the m-th significative delay, and whose statistics are obtained from the propagation medium that is intended to represent. Note that in the previous equation, the dispersion delay $\gamma_{M-1}$, commonly denoted as $\tau_{max}$, corresponds to the maximum dispersion of the channel in the time delay domain. To get the parameterization of a simulator/emulator that approximates statistically a channel with NSSF, this patent proposed the method of channel orthogonalization, which makes the channel expansion from a finite and reduced set of orthogonal functions $\psi_\zeta(\tau)$. To achieve this it is necessary to consider a frequency observational window (that corresponds to the wideband of the signal of interest), therefore, it is considered that the channel has been limited in band by a filter $g(\tau)$. The base band channel model limited in band, results as:

$$h_{bb}(t;\tau) = c_{bb}(t;\tau) * g(\tau) = \sum_{m=0}^{M-1} \mu_m(t)g(\tau - \gamma_m). \quad \text{(V)}$$

Thus, the channel correlation $E\{h_{bb})(t;\tau)h_{bb}*(s;\xi)\}=R_{h_{bb}}(t,s;\tau,\xi)$, considering stationarity, can be defined as $R_{h_{bb}}(\Delta t;\tau,\xi)$.

This channel has a finite dimensionality, then, its expansion can be done as shown below:

$$h_{bb}(t;\tau) = \sum_{\varsigma=1}^{L_{min}} \zeta_\varsigma(t)\psi_\varsigma(\tau), \quad \text{(VI)}$$

This representation of the channel characterizes the wireless channel with "non-physical trajectories", which means, that it has propagation trajectories without a physical direction, allowing to obtain a reduction in the dimensionality on the time of delay domain, which is in principle infinite to only $L_{min}$ components, or stochastic processes $\zeta_\varsigma(t)$. Thus, the functions that will be used to expand the products of the channel, $\psi_\varsigma(\tau)$, must be capable of representing any product of the channel by any SSF or NSSF considered during a simulation. It can be proven that a solution to this requirement consists on obtaining these functions from a decomposition of eigenfunctions $\psi_\varsigma(\tau)$ and eigenvalues $\lambda_\varsigma$, of a universal correlation function, $R_U(\tau,\xi)$[REF10]. This universal function of correlation is formed from a correlation function out of a stochastic non-stationary and non-correlated process $P_U(\tau,\xi)$ which has unitary values on its diagonal, for time from cero to $\tau_{max}$ maximum, considered on the SSF and NSSF that will be considered in the simulation, that is to say:

$$P_U(\tau,\xi)=\delta(\tau-\xi),\ \tau,\xi\in\{0,\max(\tau_{max})\}. \quad \text{(VII)}$$

Where $P_U(\tau,\xi)$ is here denominated as a bidimensional universal profile, meanwhile the evaluation is of its diagonal in a $P_U(\tau)$ function, denominated with the profile of universal power.

This universal bidimensional profile is later doubly convulsed by band-limiting filters $g(\tau)$ y $g(\xi)$, on the domains $\tau$ y $\xi$, respectively, to finally generate the universal correlation function $R_U(\tau,\xi)$, as shown below:

$$R_U(\tau,\xi)=\int_{-\infty}^{\infty}\int_{-\infty}^{\infty}P_U(\tau,\xi)g(\tau)g(\xi)d\tau d\xi. \quad \text{(VIII)}$$

The processes $\zeta_\varsigma(t)$ of the equation (VI) are obtained through the projection of the group of base functions $\psi_\varsigma(\tau)$ with the channel that must be transformed to the subspace, as shown below:

$$\zeta_\varsigma(t)=\int_{-\infty}^{\infty}h_{bb}(t;\tau)\psi_\varsigma(\tau)d\tau. \quad \text{(IX)}$$

Thus, the correlation of the $\zeta_\varsigma(t)$ processes, will provide us the relevant statistic information to determine how dispersive, and stationary is the channel, as well as its dimensionality once the orthogonalization has been applied. Moreover, the correlation between stochastic processes that weight the functions is defined as:

$$R_{\zeta,\kappa}(t,s)=E\{\zeta_\zeta(t)\zeta_\kappa(s)\}, \quad \text{(X)}$$

which in function of the equation (IX), results in:

$$R_{\zeta,\kappa}(t,s)=E\{\int_{-\infty}^{\infty}\int_{-\infty}^{\infty}h_{bb}(t;\tau)\psi_\zeta(\tau)d\tau d\times\int_{-\infty}^{\infty}\int_{-\infty}^{\infty}h_{bb}*(s;\xi)\psi_\kappa(\xi)dr'd\xi\} \quad \text{(XI)}$$

$$R_{\zeta,\kappa}(t,s)=\int_{-\infty}^{\infty}\int_{-\infty}^{\infty}R_{h_{bb}}(t,s;\tau,\xi)\psi_\zeta(\tau)\psi_\kappa(\xi)d\tau d\xi. \quad \text{(XII)}$$

Therefore, if the stationarity is assumed in a wide sense of the channel behavior, the fading of distortion due to the Doppler dispersion will not change in time, statistically speaking. In this case, the correlation of two processes $R_{\zeta,\kappa}(t,s)$ will only depend on the difference in the observation time $\Delta t=s-t$. Hence, assuming decorrelation in the physical trajectories in a propagation environment, it is known that:

$$R_{\zeta,\kappa}(\Delta t)=\int_{-\infty}^{\infty}\int_{-\infty}^{\infty}R_{h_{bb}}(\Delta t;\tau,\xi)\psi_\zeta(\tau)\psi_\kappa(\xi)d\tau d\xi, \quad \text{(XIII)}$$

Grouping every correlation function in a correlation tensor, with $\{R(\Delta t)\}_{\zeta,\kappa}=R_{\zeta,\kappa}(\Delta t)$ it can be found that for the case of a channel with SSF, the tensor will be fully defined from the multiplication of a function of temporal correlation from the channel temporal del canal $R_{h_{bb}}(\Delta t)$ by a matrix $\Lambda$, where its components $\{\Lambda\}_{\zeta,\kappa}$ denote the correlation in time of delay of the virtual trajectories $\zeta$, $\kappa$.

Thus, in the state of art, the conceptualization of a channel emulator/simulator has been mainly based mainly in the generation of waveforms, which fulfill the statistics of correlation observed in each value of delay from the tensor of correlation $R(\Delta t)$ with a power defined by the average power $\lambda_{m,m}$ from the m-th delay.

Nevertheless, the conceptualization of the channel simulator/emulator for the case of a more realistic channel where the channel dispersion function is observed as a function of the non-separable NSSF is not random, because the correlation tensor will have a different Doppler correlation function on each delay $\tau$, and therefore, among the other different orthogonal expansion values, a different channel correlation $R_{\zeta,\kappa}(\Delta t)$ would be obtained.

Hence, this patent is explained the method and apparatus that will generate the channel realizations that correspond to the correlation tensor from a SSF channel as well as for a channel with NSSF. For the case of the non-stationary channel emulation, this patent explains too how the method and apparatus allow to obtain a NSSF that varies on time, being capable of reproducing propagation environments whose statistics evolve with time.

Simulation/Emulation Method of a Doubly Selective Channel, Stationary or Non-Stationary in Time I. Stationary Channel Simulation/Emulation Case.

For the stationary channel emulation case where it is intended to produce non-separable dispersion functions it is necessary to perform the following procedure considering a dispersion function $S(v,\tau)$ that can be obtained through measurements, defined from communication standards or by the user in an arbitrary way. Therefore, this given function $S(v,\tau)$ could be reproduced during a period of simulation/emulation Tsim, as desired. The steps to follow are shown below:

a) To define the dispersion function, $S(v,\tau)$ inherent to the channel $c_{bb}(t;\tau)$.
b) To find the band-limiting filter $g(\tau)$ given the maximum bandwidth of the signals to transmit.
c) To obtain the limited channel through the convulsion of the channel with the limiting filter according to the expression (V).
d) To obtain the universal correlation function $R_U(\tau,\xi)$ which will be able to represent any correlation information from the time delay domain for any value of the Doppler frequency v, from i. To define the maximum time delay $\tau_{max}$
ii. To generate a bidimensional universal profile that fulfills the expansion of subspaces of the correlation functions limited in time delay. For example, the universal bidimensional profile is defined from the information of the maximum delays, as defined on (VII):

$$P_U(\tau,\xi)=\delta(\tau-\xi), \tau,\xi \in \{0,\tau_{max}\}$$

iii. To generate the universal correlation function through (VIII)

$$R_U(\tau,\xi)\int_{-\infty}^{\infty}\int_{-\infty}^{\infty}P_U(\tau,\xi)g(\tau)g(\xi)d\tau d\xi$$

e) To obtain the group of functions and its corresponding weights from the correlation function $R_U(\tau,\xi)$, through some factorization technique like Cholezky factorizations, LU, $LDL^T$, QR, etc., which allow to expand the correlation function $R_U(\tau,\xi)$. It is used for example in the decomposition of eigenvalues and eigenfunctions of $R_U(\tau,\xi)$.

f) From a certain permissible error range in the approximation, same that is given by the relative power of the eigenvalues, choose the $\zeta=1, 2, \ldots, L_{min}$ universal eigenfunctions, $\psi_\zeta(\tau)$, and universal eigenvalues, $\lambda_\zeta$, that can represent the processes with lower or equal error as the one stablished by the range.

g) To obtain the correlation of the channel $R_{h_{bb}}(\Delta t;\xi,\xi)$ through $$R_{h_{bb}}(t,s;\tau,\xi)=E\{h_{bb}(t;\tau)h_{bb}*(s;\xi)\}, con \Delta t=s-t,$$

this function is directly obtained from the definition application of the mentioned correlation over a given channel, and with the knowledge of $S(v,\tau)$ and of the shaping filter $g(\tau)$.

h) Using the universal functions $\psi_\zeta(\tau)$, carry out a orthogonalization of the correlation function $R_{h_{bb}}(\Delta t;\tau,\xi)$, in the time delay domains, to obtain the tensor$R(\Delta t)$ of dimension $L_{min} \times L_{min}$, whose components are obtained from $$R_{\zeta,\kappa}(\Delta t)=\int_{-\infty}^{\infty}\int_{-\infty}^{\infty}R_{h_{bb}}(\Delta t;\tau,\xi)\psi_\zeta(\tau)\psi_\kappa(\xi)d\tau d\xi,$$

in the same way, a version with finite and reduced dimensionality will be obtained from the channel correlation tensor $R(\Delta t)$, with values in each register such as $\{R(\Delta t)\}_{\zeta,\kappa}=R_{\zeta,\kappa}(\Delta t)$ using the orthogonalization technique corresponding to a doubly dispersive channel.

i) To generate a group of stochastic $\zeta_\zeta(t)$ that are arbitrarily long but with manageable complexity, and whose auto correlation functions and cross-correlation are given by $R(\Delta t)$. To achieve this task, the approximation will be performed in two steps: 1) Stochastic processes will be generated $x_{\zeta,l}(t)$ with the same statistics of correlation and cross-correlation than the $\zeta_\zeta(t)$ processes, but observed only during a window of time $T_{vent}$, i.e., $$l*T_{vent}-\frac{T_{vent}}{2} \le t < l*T_{vent}+\frac{T_{vent}}{2}, l=1,2,\ldots,\infty; \quad (XIV)$$

and
2) The concatenation scheme of windowed processes will be used presented on the patent "Method And System For Generating Stationary And Non-Stationary Channel Realisations Of Arbitrary Length".

Beginning with the first step, the channel realizations of the process $x_{\zeta,l}(t)$ can be generated through the sum of cissoids, so it will proceed to find the weights and frequencies of these cissoids for each of the processes. Then, starting form a $R(\Delta t)$ tensor, where the processes are jointly stationary, it implies that the tensor $S(v)$ consists of processes jointly non-correlated in the dual domain dual (in this case the Doppler frequency), so, we can do the following:

i. To obtain the Doppler tensor $S(v)$ through the Fourier transformation of $R(\Delta t)$ according to the variable $\Delta t$.

ii. To approximate the tensor $S(v)$ according to its discrete version in the frequency variable v, through its own integration in certain frequency centroids $v_p$; this is, $v_p=p\Delta_v$ where $\Delta_v$ is the integration interval; which means:

$$\int_{p-\Delta v/2}^{p+\Delta v/2}S(v)dv=S(v_p), \quad (XV)$$

and p is a full variable with basis on $P_1 \le p < P_2$. The discretized frequency correlation tensor, $S(v_p)$, can now be seen as a composition of matrices, where for $\alpha$ value of $v_p$ there is a given matrix $M_p$.

iii. Once the group of correlation matrices is obtained $M_p$, then the factorization of the matrices is performed from some matrix factorization method such as the Cholezky techniques, LU, $LDL^T$, QR, etc. For instance, in this patent, the algorithm of eigenvalues and eigenfunctions is used, providing the following solution:

$$M_p=\beta_p \cdot \phi_p \cdot \beta_p^H. \quad (XVI)$$

iv. As a result of the factorization process, the matrices of the eigenvectors are obtained $\beta_p$ and eigenvalues $\phi_p$ correspond to a frequency value $v_p$, which will produce a transformation operator that will impregnate a determined correlation to a vector of white complex Gaussian random variables $\rho_p$, in dimension $L_{min} \times 1$, and with a variance of $=\frac{1}{2}$ for real-complex dimension. The vector of correlated variables $c_p$ will represent the parameters of amplitude $L_{min}$ sinusoidal complex functions for each value of frequency $v_p$, as described in the following expression:

$$c_p=\beta_p \cdot (\rho_p \odot \text{sqrt}(\delta_p)). \quad (XVII)$$

Where $\delta_p$ is a vector of the diagonal from $\phi_p$ and $\odot$ e is the product of Hadamard. The value $c_{p,\zeta}=\{c_p\}_\zeta$ corresponds to the weight of one of the sinusoids that will make part of a stochastic process.

v. The group of variables $\{c_{P_1,\zeta},\ldots c_{P_2,\zeta}\}$ with their respective frequencies $v_p$ are used to produce realization of a process $x_{\zeta,l}(t)$ in such way that:

$$x_{\zeta,l}(t)=\sum_{p=P_1}^{P_2}c_{p,S}e^{j2\pi v_p t}, l=1,2,\ldots,\infty. \quad (XVIII)$$

Figure 9:
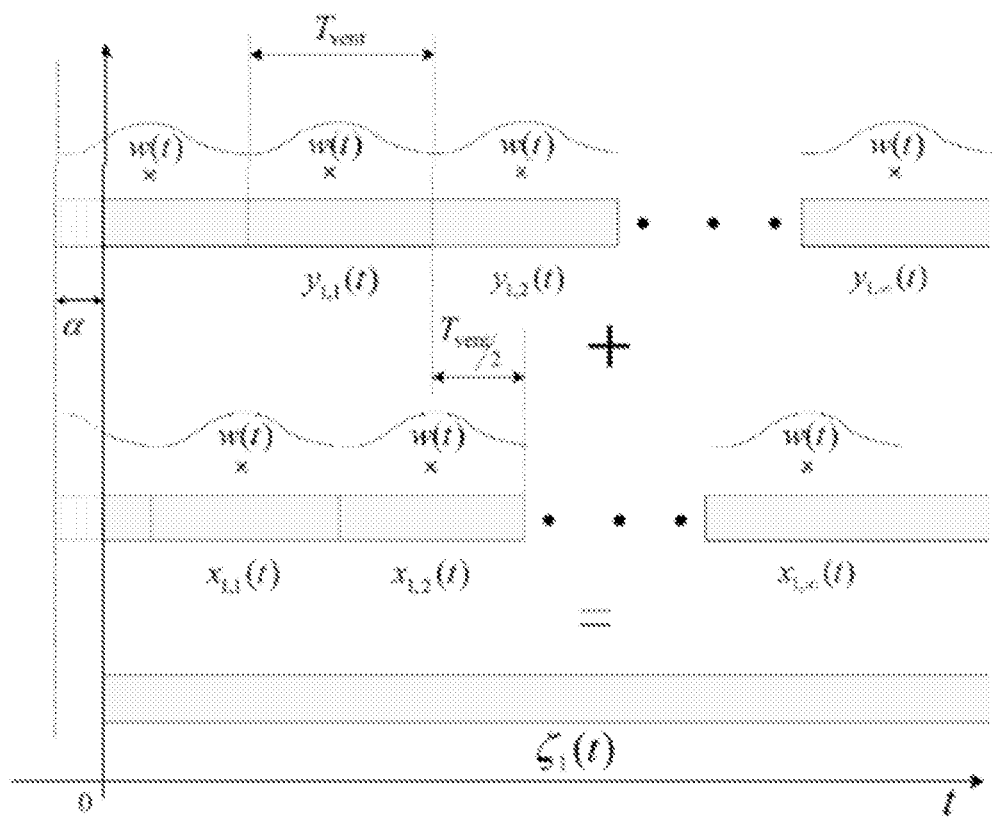
FIG. 9 shows the windowing process with w(t) of "$T_{vent}$" duration for each of the produced sequences $x_{\zeta,i}(t)$ and $y_{\zeta,i}(t)$ one "$T_{vent}/2$" outdated compared to the other, and both with an outdate of $\alpha$ value to form an arbitrarily long process $\zeta_\zeta(t)$ for $\zeta=1$.

Note that these processes have the autocorrelation and cross-correlation defined by $S(v_p)$, which, considering a sufficient sampling interval, which will be very similar to $S(v)$, and therefore, they will have the same correlation in the period of time associated to $R(\Delta t)$, as will be shown later in the patent.

j) In this same way another process is formed $y_{\zeta,l}(t)$ with the new realization of the variables $c_{p,\zeta}$. The processes $x_{\zeta,l}(t)$ and $y_{\zeta,l}(t)$ will have evaluated realizations by a window $w(t)$ that will last $T_{vent}$ for $\zeta=1, 2, \ldots, L_{min}$, and $l=1, 2, \ldots, \infty$.

k) Next, the sequences $x_{\zeta,l}(t)$ and $y_{\zeta,l}(t)$ shall be added up, which will have a phase offset from a uniform random variable $\alpha$ defined in the range $$\left(-\frac{T_{vent}}{2}, \frac{T_{vent}}{2}\right],$$

which value will remain constant for $l=1, 2, \ldots, \infty$, and where $x_{\zeta,l}(t)$ also will be have a phase offset $T_{vent}/2$, for which will be obtained $L_{min}$ add of sequences, as appropriate to the index of the generated process $\zeta=1, 2, \ldots, L_{min}$, as described in FIG. 9. Thus, $L_{min}$ arbitrary long stochastic processes are generated, $\zeta_\zeta(t)$, with autocorrelation and predefined cross-correlation statistics by $R(\Delta t)$ and with reduced complexity.

l) Then, the expansion of the channel realization $\hat{h}_{bb}(t;\tau)$ is performed from the vector multiplication of processes $\zeta_\zeta(t)$, with the universal orthogonal set of functions $\psi_\zeta(\tau)$, as described next:

$$\hat{h}_{bb}(t;\tau) = \sum_{\varsigma=1}^{L_{min}} \zeta_\varsigma(t)\psi_\varsigma(\tau), \quad \text{(XIX)}$$

m) Likewise, the discretization of the channel realization is done $\hat{h}_{bb}(t;\tau)$ with a sampling period of $T_s$, where the processes $h_q[nT_s]$ are obtained for $q=0, 1, 2, \ldots, Q-1$.

n) Finally, the processes $h_q[nT_s]$ for $q=0, 1, 2, \ldots, Q-1$, are applied with a convolution filter applied to the channel with the purpose of impregnating the distortions to the signal of interest $u(t=nT_s)$ according to the defined statistics following a stationary doubly selective propagation environment with a non-separable dispersion function.

II Non-Stationary Channel Simulation/Emulation Case.

Figure 13:
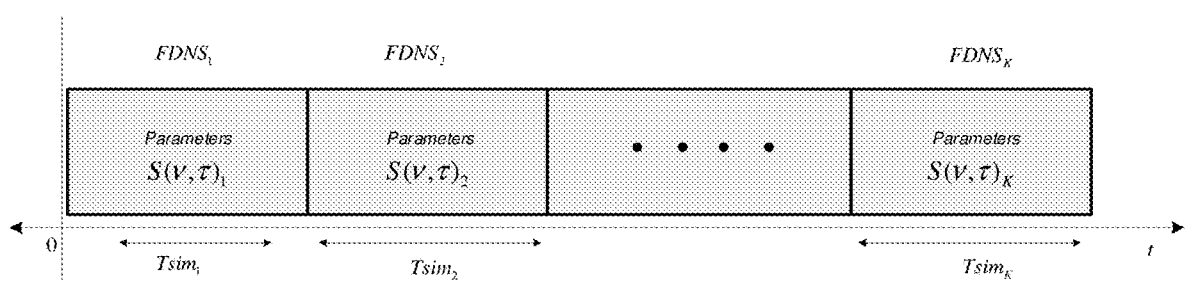
FIG. 13 shows the scheme of parameterization to follow in order to be able to generate non-stationary channels, from the finite number of dispersion functions that are desired to reproduce, K which can be either NSSF or SSF, during the periods of simulation/emulation $Tsim_1, Tsim_2, \ldots, Tsim_K$.

For the non-stationary channel emulation case, where the aim is to produce non-separable dispersion functions that evolve with time, it is necessary to do the extension of the analysis and procedure presented in the previous subsection, considering a finite number K of dispersion functions $S(v,\tau)_k$, with $k=1, 2, \ldots, K$, where each dispersion function might be reproduced during a period of simulation/emulation time $Tsim_k$, as desired.

a) To define the K dispersion functions $S(v,\tau)_k$ with $k=1, 2, \ldots, K$ inherents to each channel $c_{bb}(t;\tau)_k$.
b) To determine the band-limiting filter $g(\tau)$ according to the maximum of the signals to transmit.
c) To obtain the band limited channels through the convolution of the channel with the band-limiting filter, for each of K dispersion functions to consider:

$$h_{bb}(t;\tau)_k = C_{bb}(t;\tau)_k * g(\tau) \quad \text{(XX)}$$

d) To define the simulation/emulation time $Tsim_k$ of the K scattering functions $S(v,\tau)_k$ with $k=1, 2, \ldots, K$, as shown in FIG. 13.
e) To obtain a universal correlation function $R_U(\tau,\xi)$ that can expand the channels of every dispersion function of interest, starting from
  i. To define the maximum of all the delay maximums $\tau_{max}$ from the K dispersion functions to consider.
  ii. To generate a bidimensional profile that fulfills the principle of subspaces expansion of correlation functions limited in time delay. For example, the universal bidimensional profile is defined through the information of the maximum delays as defined in (VII):

$$P_U=(\tau,\xi)=\delta(\tau-\xi), \quad \tau,\xi \in \{0,\max(\tau_{max})\}$$

iii. To generate the universal correlation function through (VIII)

$$R_U(\tau,\xi)=\int_{-\infty}^{\infty}\int_{-\infty}^{\infty} P_U(\tau,\xi)g(\tau)g(\xi)d\tau d\xi.$$

f) To obtain the group of functions and its corresponding weights from the correlation function $R_U(\tau,\xi)$ from some matrix factorization technique such as the Cholezky factorizations, LU, $LDL^T$, QR, etc., that allow to expand the correlation function $R_U(\tau,\xi)$, as an example the decomposition of eigenvalues and eigenvectors from $R_U(\tau,\xi)$ is used.

g) From a given permissible range of error in the approximation, same that is given by the relative power of the eigenvalues, choose the $\zeta=1, 2, \ldots, L_{min}$ universal eigenfunctions $\psi_\zeta(\tau)$, and universal eigenvalues $\lambda_\zeta$, according to the defined factorization technique on the previous point, that can represent the processes with a lower or equal error than stablished on the range.

h) For each of the considered NSSF $S(v,\tau)_k$ with $k=1, 2, \ldots, K$, obtain $R_{h_{bb}}(\Delta t;\tau,\xi)_k$, $R(\Delta t)_k$, $S(v)_k$, $S(v_p)_k$, $M_{p_k}$, $\beta_{p_k}$, $\phi_{p_k}$, $\rho_{p_k}$, $\delta_{p_k}$, $C_{p_k}$, for each of the NSSF, according to how it was done on the previous section.

i) Generate K pairs of processes $x_{\zeta,l}(t)_k$ and $y_{\zeta,l}(t)_k$ through the generation of stochastic processes method explained by the points a) to k) from the stationary case for each time of stationary generation $Tsim_k$ with $k=1, 2, \ldots, K$. For each $Tsim_k$, the windowing method will contemplate $l=1, 2, \ldots, Lsim_k$, independent realizations that last $T_{vent}$, given that $Lsim_k=Tsim_k/T_{vent}$.

j) Each of the realizations of the sequences $x_{\zeta,l}(t)_k$ and $y_{\zeta,l}(t)_k$ are evaluated by a window $w(t)$ for $\zeta=1, 2, \ldots, L_{min}$, and $l=1, 2, \ldots, Lsim_k$, with a phase offset obtained from a uniform random variable $\alpha$ which value will remain constant for $l=1, 2, \ldots, \Sigma Tsim_k$, and where $x_{\zeta,l}(t)_k$ will be have a phase offset $T_{vent}/2$, and then added up to generate the $L_{min}$ arbitrary long and non-stationary stochastic processes $\zeta_\zeta(t)$.

k) Likewise, the expansion of the realization of the channel $\hat{h}_{bb}(t;\tau)$ is performed with the set of defined functions according to the predefined factorization technique. As an example, the expansion of the channel $\hat{h}_{bb}(t;\tau)$ is performed from the vector multiplication of the processes $\zeta_\zeta(t)$, with the universal orthogonal group of functions $\psi_\zeta(\tau)$, as described in (XIX).

l) To achieve with the stated by the communication standards or by the user, it is necessary to perform the sampling of the channel $\hat{h}_{bb}(t;\tau)$ with a sampling period of $T_s$, to obtain the coefficients of a linear filter variable in time, which derivations are the discrete processes $h_q[nT_s]$ para $q=0, 1, 2, \ldots, Q-1$, m) Finally, the discrete channel with the signal of interest $u(t=nT_s)$ is convolved for the obtention of the output signal $r(t=nT_s)$ according to a doubly selective non-stationary propagation environment with a non-separable dispersion function.

FIG. 1 shows an example of a dispersion function of a doubly selective dispersion channel, where it can be observed that the power profile is different for each value of the Doppler frequency v. Likewise, the power of delay profile observed on each value of Doppler frequency v can be continuous or discrete, and have arbitrary shapes depending on the observed communication channel.

Figure 2:
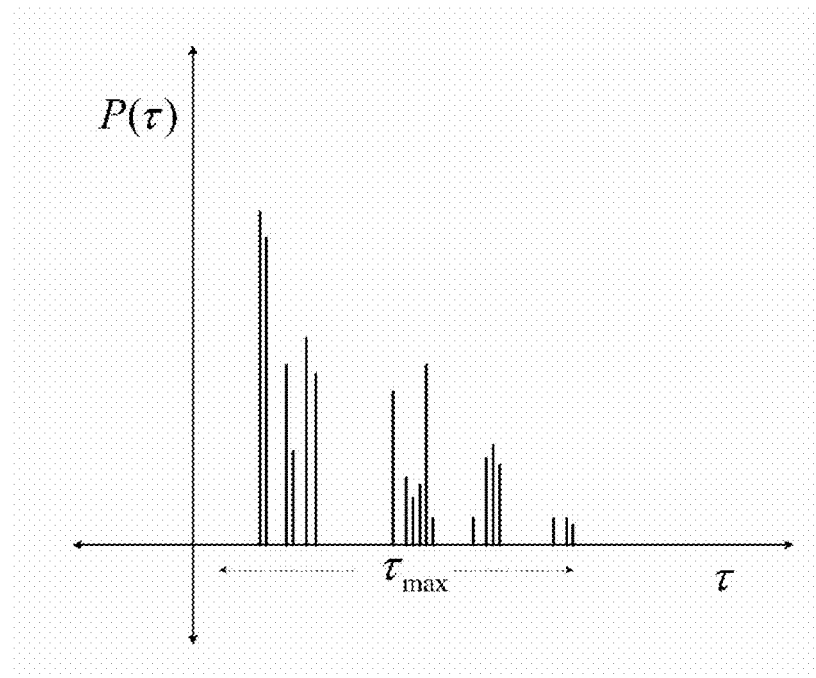
FIG. 2 shows an example of a discrete profile from the power delay $P(\tau)$ with identifiable components.

FIG. 2 shows an example of a discrete profile of delay power $P(\tau)$ with identifiable components where the parameter of maximum delay $\tau_{max}$ is observed, which determines the value of the maximum delay that must be considered starting from a relevant power value.

Figure 3:
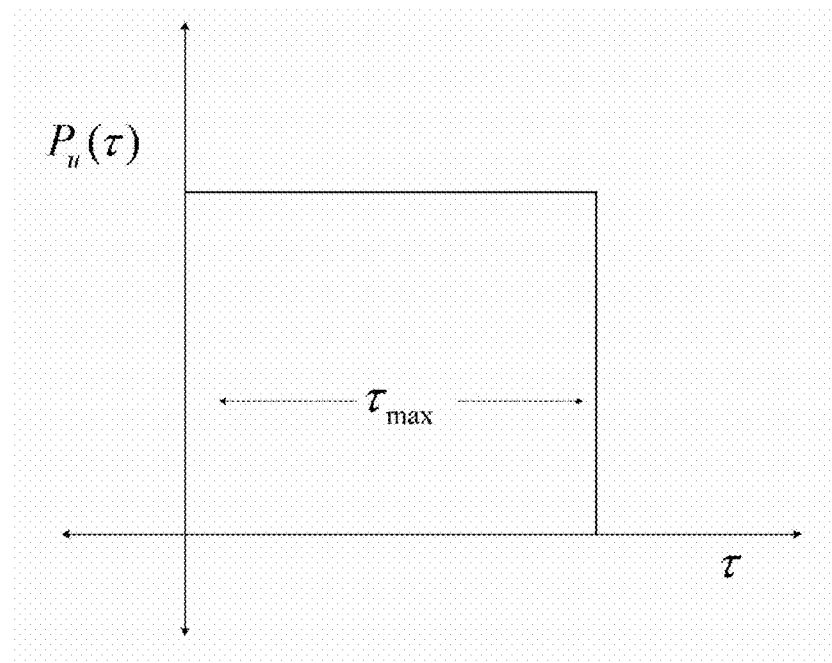
FIG. 3 illustrates the universal profile from the universal power, which is used to obtain a set of eigenvalues and eigenfunctions to apply the technique of channel orthogonalization.

FIG. 3 illustrates the universal profile of power which is used to obtain a group of eigenvalues and eigenfunctions to apply the orthogonalization technique for channels. The group of eigenfunctions obtained allows the expansion of any SSF or NSSF, as well as the realization of the underlying channel, being the channel continuous or discrete, where the most part of the delay energy is found inside od the maximum delay parameter $\tau_{max}$.

Figure 4:
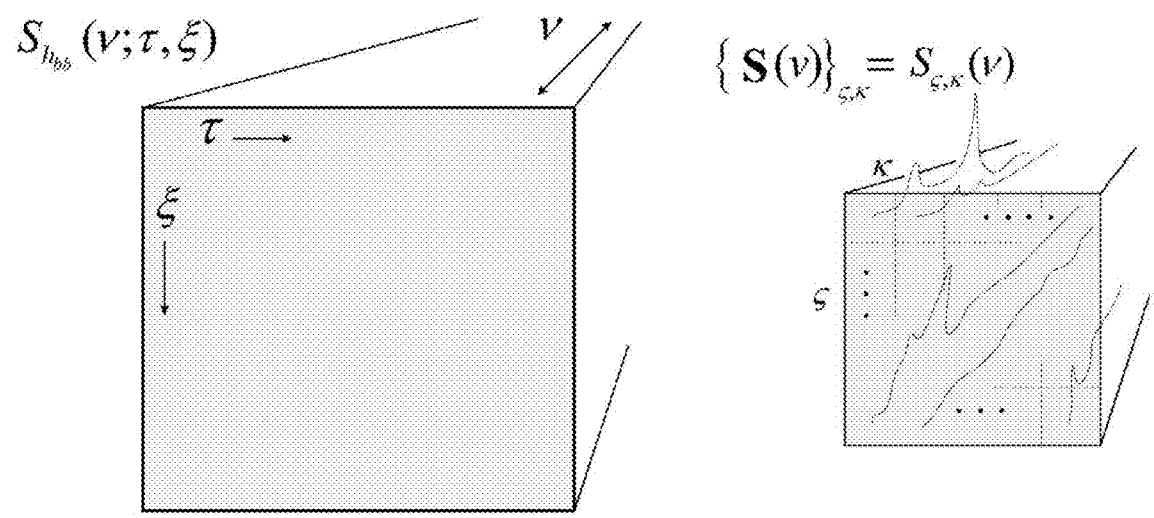
FIG. 4 shows the correlation tensor in the Doppler frequency domain v, $S_{h_{bb}}(v;\tau,\xi)$, and the simplification to obtain a finite dimensional tensor, $S(v)$, with components $\{S(v)\}_{\zeta,\kappa} = S_{\zeta,\kappa}(v)$.

FIG. 4 shows the correlation tensor in the Doppler frequency domain v, $S_{h_{bb}}(v;\tau,\xi)$, a and the simplification that is done in the dimensionality that is held in the time of delay domain given by the variables, $\tau$ y $\xi$, through the transformation to space of the universal functions, to obtain a finite dimension tensor, S(v), with components $\{S(v)\}_{\xi,\kappa} = S_{\xi,\kappa}(v)$.

Figure 5:
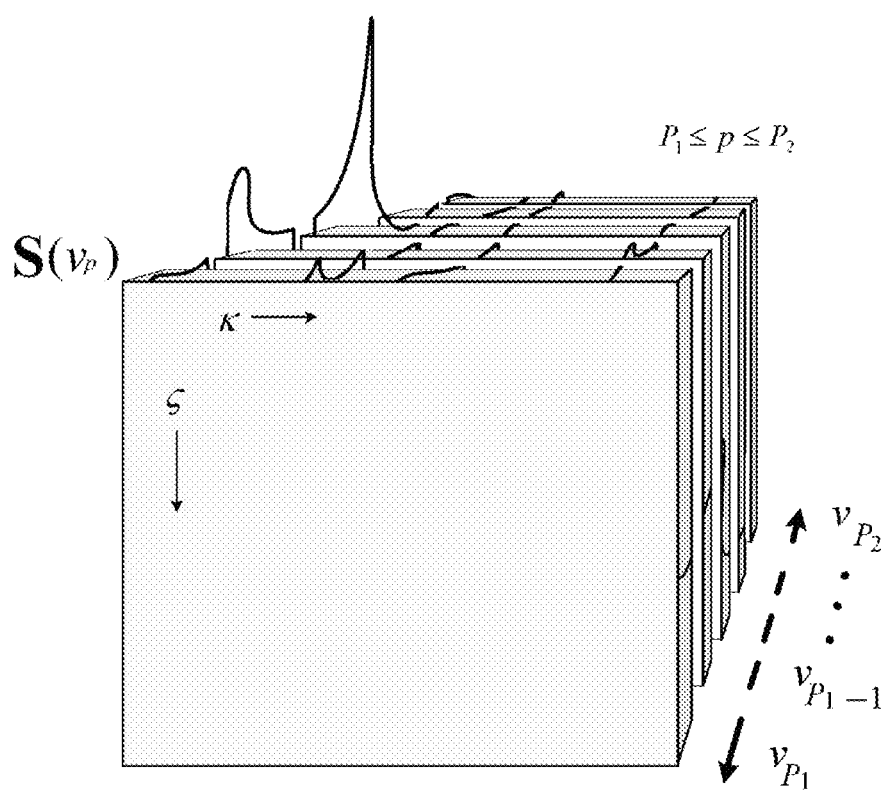
FIG. 5 illustrates the discretization in the frequency domain of the frequency-correlation tensor $S(v)$, to result in $S(v_p)$.

FIG. 5 illustrates the discretization in the frequency domain of the correlation frequency tensor S(v), to result in $S(v_p)$. This given discretization is performed from an energy integration scheme of the correlation tensor S(v) observed through the frequency domain v, around the frequencies $v_p$.

Figure 6:
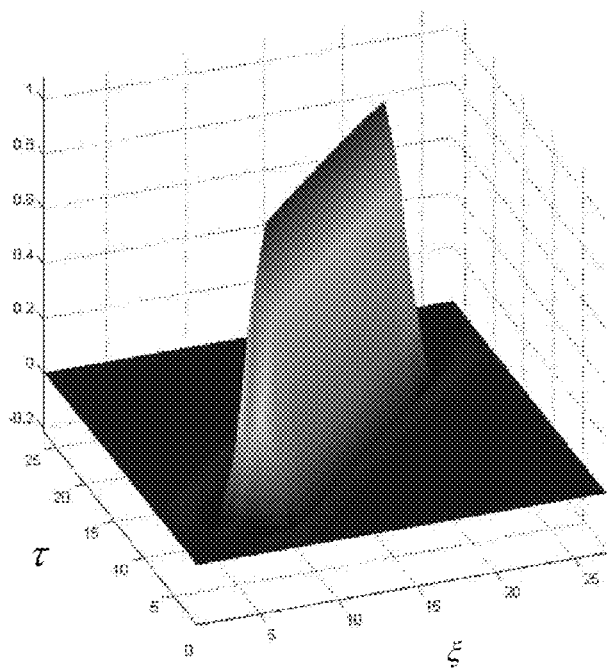
FIG. 6 illustrates the universal correlation function, $R_U(\tau, \xi)$, same that is used to produce a set of eigenvalues and eigenfunctions, $\lambda_\zeta$ y $\psi_\zeta(\tau)$, respectively.

FIG. 6 shows the universal correlation function, $R_U(\tau,\xi)$, a same that is obtained from a universal power profile from FIG. 3 when the profile is used as the bidimensional correlation of a stochastic process on the time delay, non-stationary and uncorrelated, and that has been convolved twice by band-limiting filters $g(\tau)$ and $g(\xi)$, on the domains $\tau$ and $\xi$, respectively. The channel orthogonalization technique allows us to obtain from this correlation function, a set of eigenvalues and eigenfunctions, $\lambda_\xi$ y $\psi_\xi(\tau)$, respectively.

Figure 7:
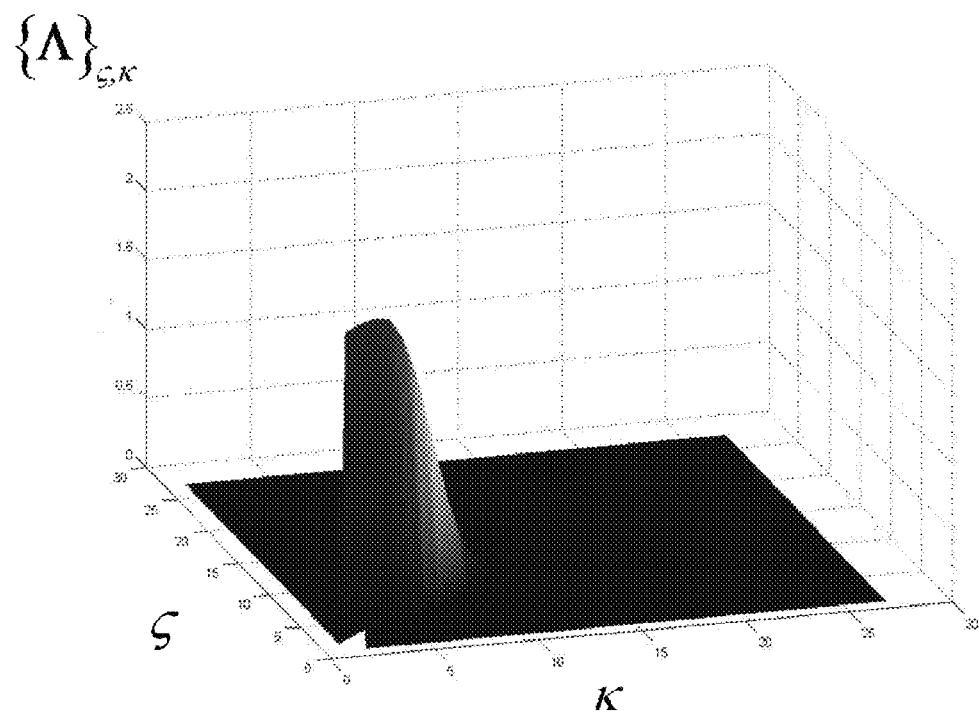
FIG. 7 shows the function of the eigenvalues correlation, $\lambda_\zeta$ results of the eigen-composition of $R_U(\tau,\xi)$ shown in FIG. 6.

FIG. 7 shows the correlation function of the eigenvalues $\lambda_\xi$ resulting from the eigen-decomposition of $R_U(\tau,\xi)$ shown in FIG. 6. It can be observed that the most part of the energy is found on the first eigenfunctions, therefore, it can be defined as a reduced group of $L_{min}$ elements as a result of defining a mean quadratic error of approximation.

Figure 8:
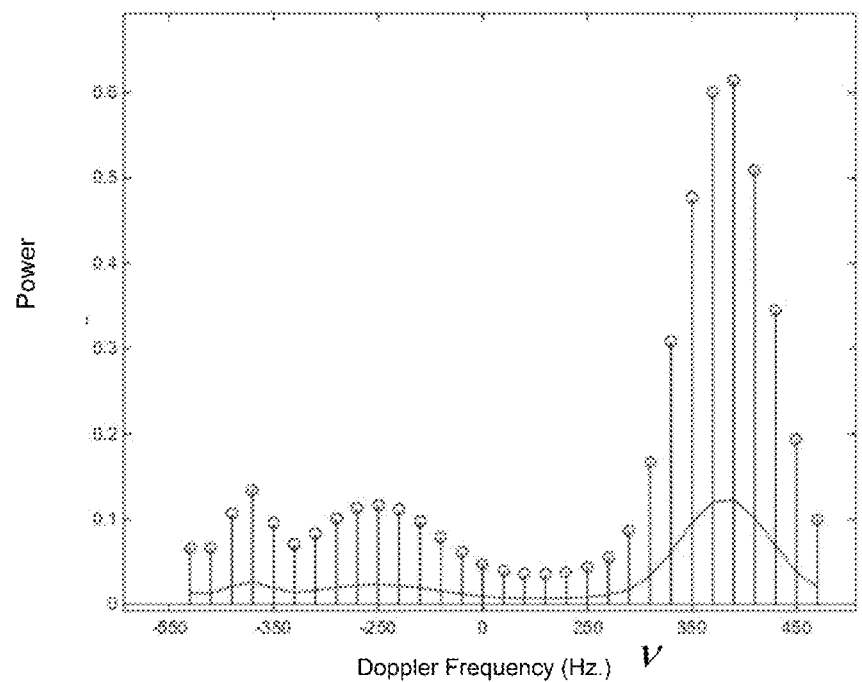
FIG. 8 illustrates an example of the frequency discretization that can be applied to a NSSF continuous profile, with the objective of producing stochastic processes from a SOS technique.

FIG. 8 illustrates an example of the frequency discretization that can be applied to a continuous DPSD profile, with the objective of generating stochastic processes from a sum of sinusoids technique. Different methods can be used to achieve this discretization, such as the harmonic decomposition [REF12], which is used as an example in this patent that consists of integrating an area surrounding the frequency values $v_p$, or any other technique.

FIG. 9 shows the windowing process of w(t) with a duration of $T_{vent}$ for each one of the sequences $x_{\xi,i}(t)$ y $y_{\xi,i}(t)$ with a phase offset given by $\alpha$, in order to perform then, the sum of the two sequences to get an arbitrarily long process $\zeta_\xi(t)$ for $\zeta=1$.

Figure 10:
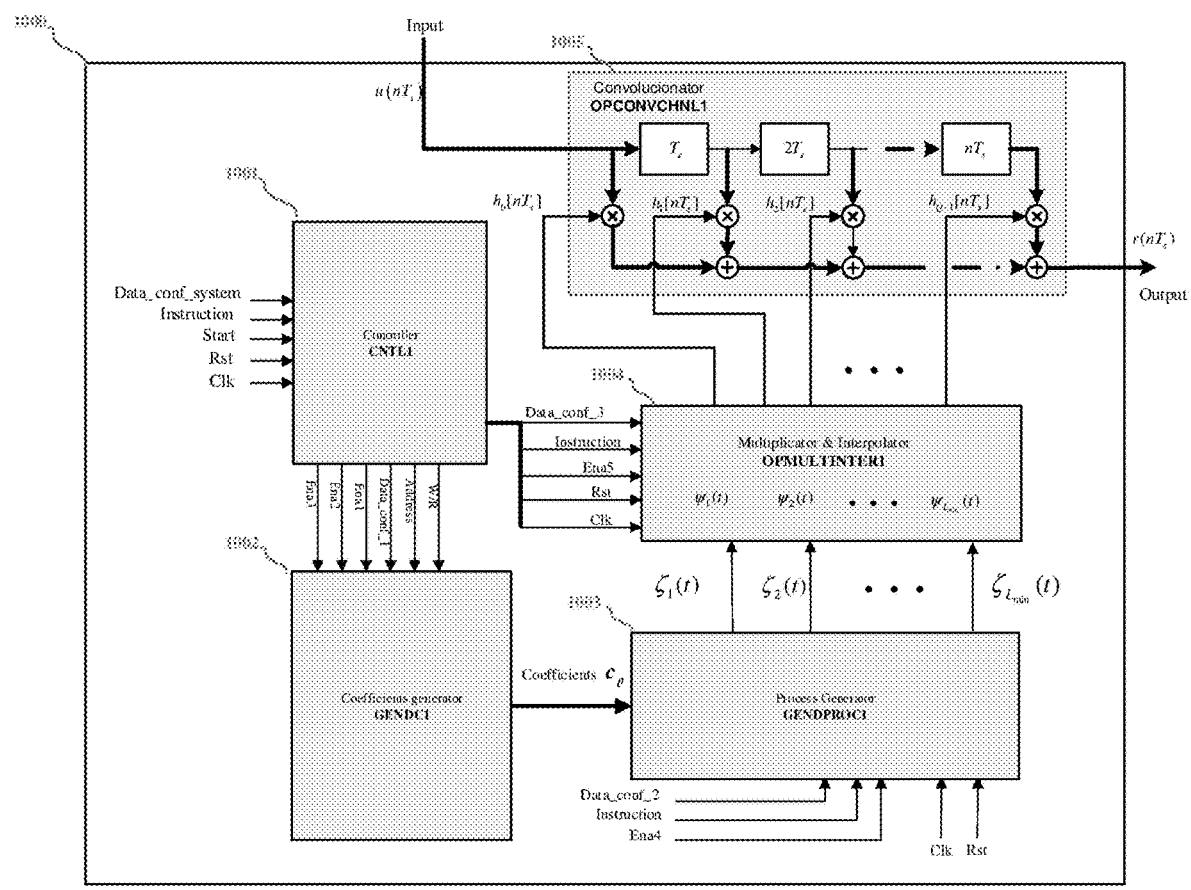
FIG. 10 shows the 1000 architecture of the Doubly Selective Channel Emulator, Stationary or Non-stationary in time, with Non-separable Dispersion Function.

FIG. 10 shows the 1000 architecture of the Doubly Selective Channel Emulator, Stationary or Non-stationary in time, with a Non-separable Dispersion Function, which is consists of 5 main modules: the 1001 CNTL1 controlling module, the 1002 GENDC1 generator of correlated coefficients module, the 1003 GENDPROC1 correlated stochastic processes module, the 1004 OPMULTINTER1 multiplier and interpolator module and the 1005 OPCONVCHNL1 channel convolutionator module.

Figure 11:
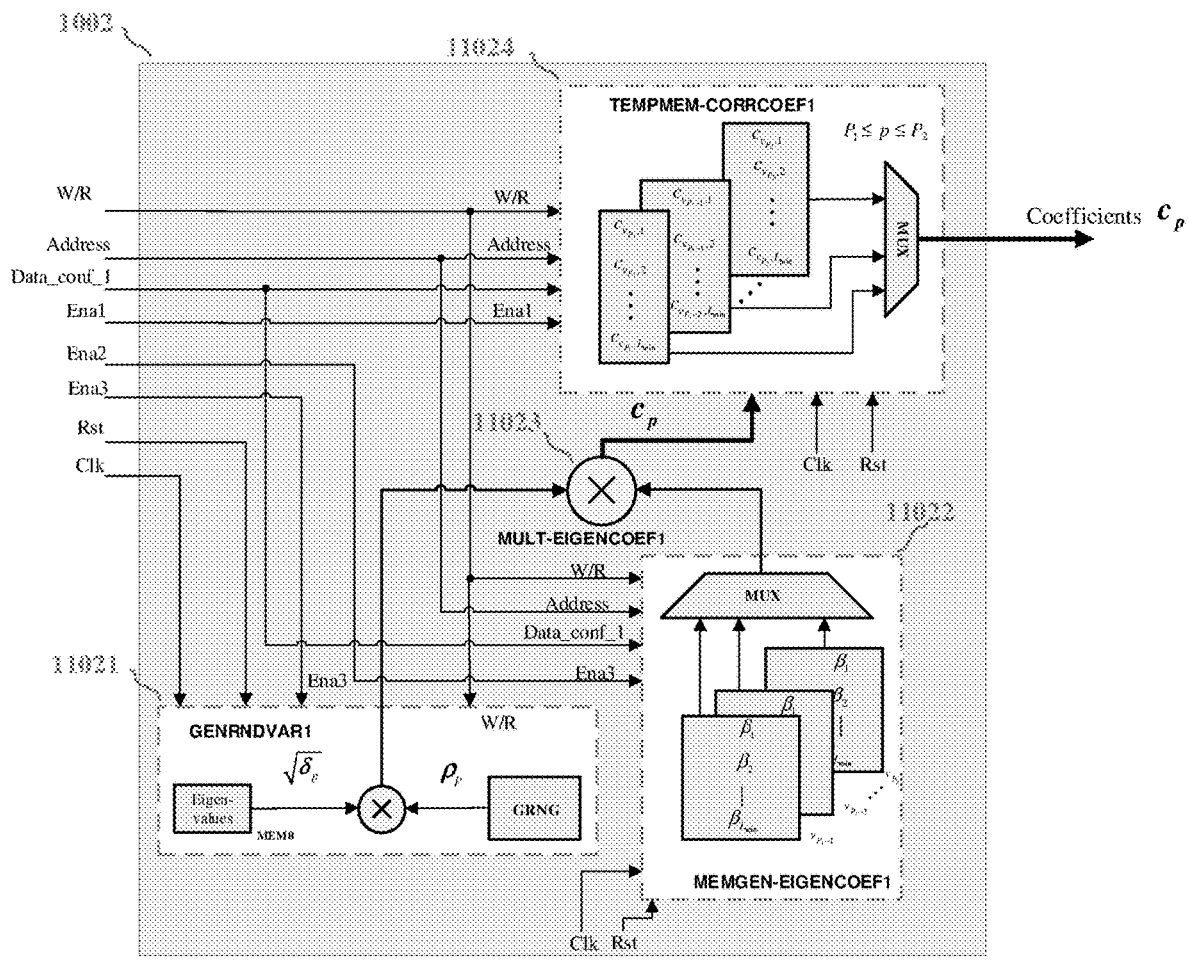
FIG. 11 illustrates the architecture of the generator module of correlated coefficients 1002 GENDC1.

FIG. 11 illustrates the 1002 GENDC1 correlated coefficient generator module's architecture which consists of 4 main elements: the 11021 GENRNDVAR1 random variable generator with preferred variance, the 11022 MEMGEN-EIGENCOEF1 generator and storage of eigenfunctions for the expansion of the coefficients module, the 11023 MULT-EIGENCOEF1 multiplication between random variables and eigenfunctions module and the 11024 TEMPMEM-CORRCOEF1 temporary storage of correlated coefficients module.

Figure 12:
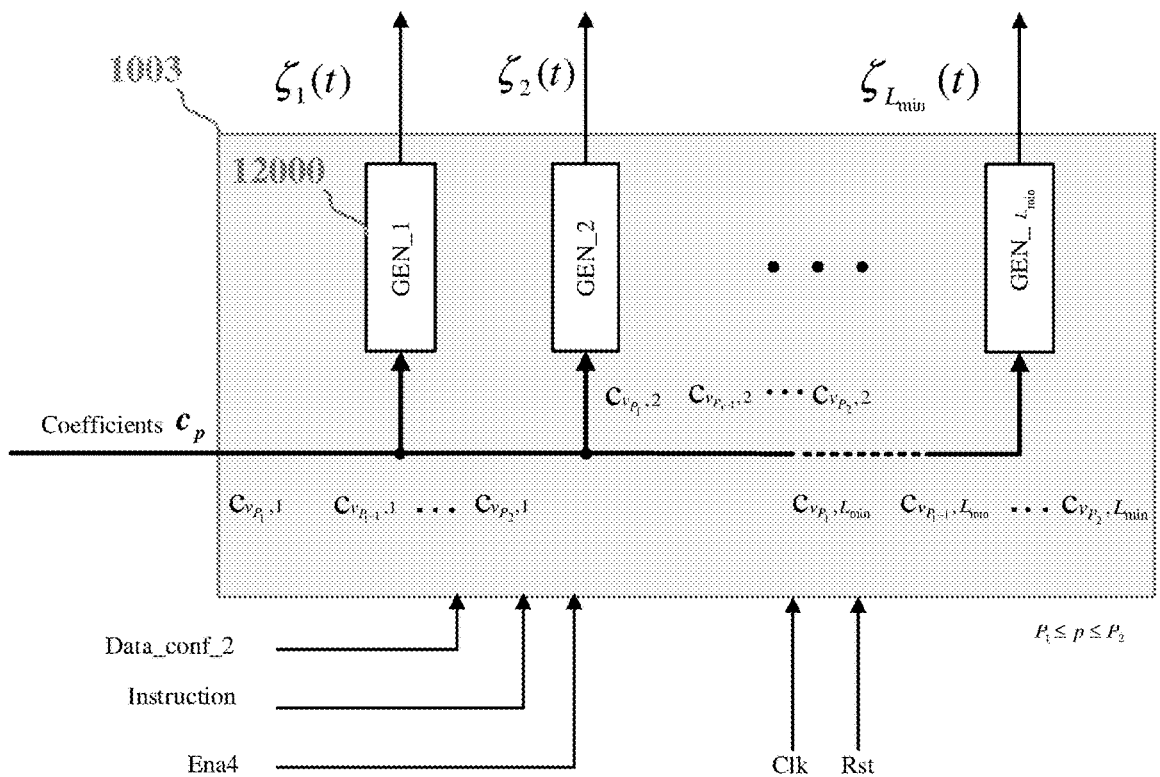
FIG. 12 shows the generator module of stochastic processes 1003 GENDPROC1.

FIG. 12 shows the 1003 GENDPROC1 correlated stochastic processes module which is made up by $L_{min}$ 12000 generator modules of stochastic processes based on a windowing scheme presented on the patent "Method And System For Generating Stationary And Non-Stationary Channel Realisations Of Arbitrary Length". This given modules, parameterized from the obtained coefficients of the generated module of correlated coefficients 1002 GENDC1.

FIG. 13 shows the parameterization scheme to follow in order to keep on generating non-stationary channels from the finite number K of dispersion functions that are intended to be reproduced, which could be either SSF or NSSF, during the periods of time of emulation/simulation $Tsim_1$, $Tsim_2$, . . . , $Tsim_K$. As to say, the stationary channel generation method is used during each of the specified windows by $Tsim_K$, and then they concatenate each other also considering the windowing method, to produce a non-stationary channel in a global way.

Figure 14:
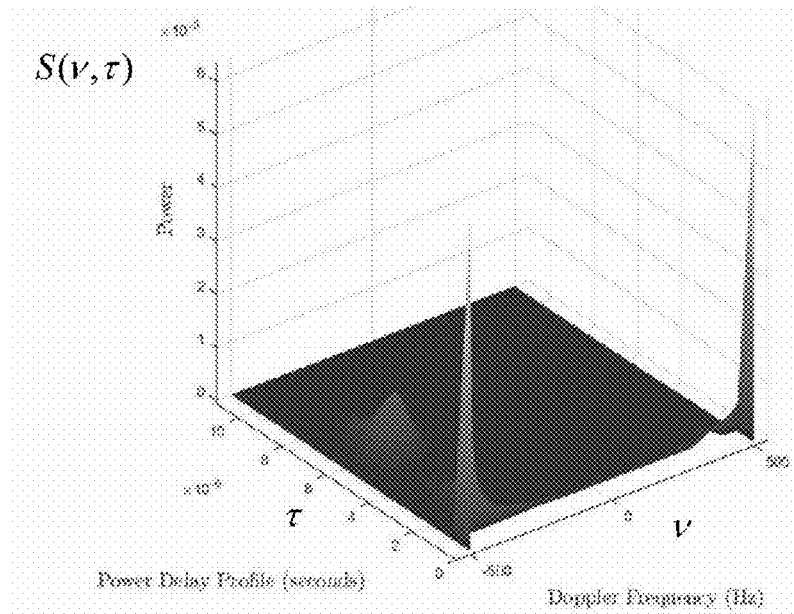
FIG. 14 shows the non-separable dispersion function previewed by the COST-BU standard and that is used as an example for the obtaining of the system's performance results that is presented in this patent.

FIG. 14 shows the NSSF previewed by the COST-BU standard and that is used as an example for the obtaining of the performance results of the system presented in this patent. The parameters of the dispersion function consider a Doppler bandwidth [−500 Hz, 500 Hz] with a maximum delay value of $\tau_{max}$=10e-6 seconds and a sampling frequency of $F_s$=1.35 Mmuest/seg.

Figure 15A:
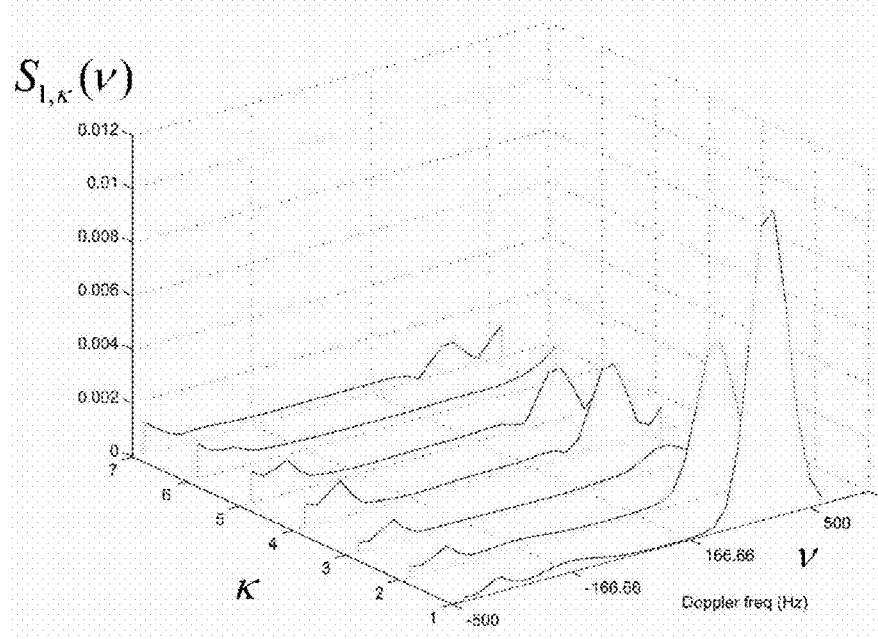
FIG. 15a shows the comparison of the results to evaluate the theoretical correlation tensor components, $S\_(1,\kappa)$ $(v\_p)$, and the one obtained by the estimation of the simulations, $S\_(1,\kappa\_sim)$ $(v\_p)$, which represent the Doppler frequency correlation statistics related to the other eigenfunctions for the NSSF shown in FIG. 14.
Figure 15B:
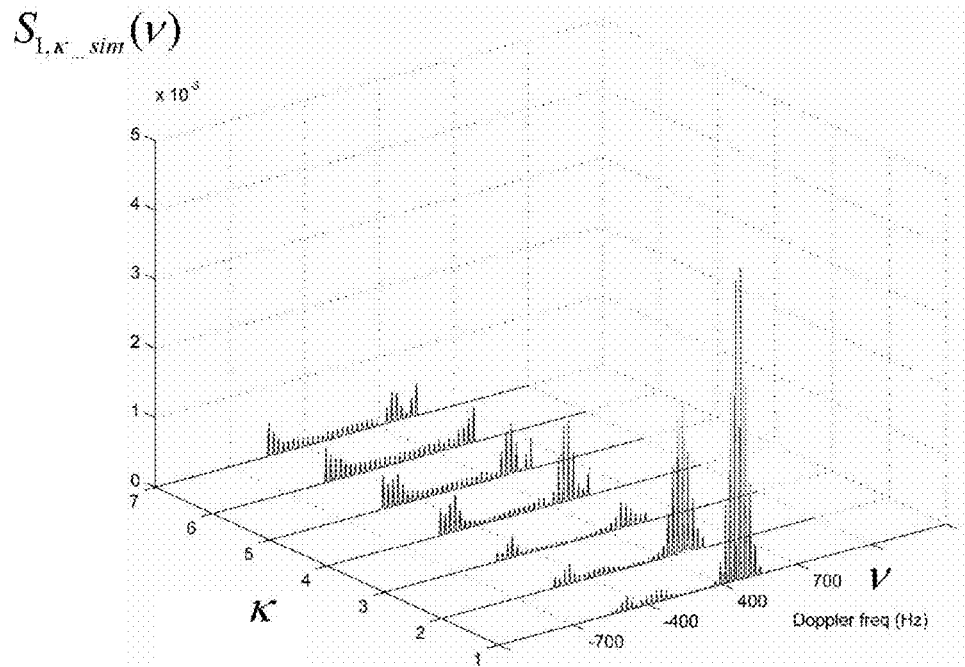
FIG. 15b shows the comparison of the results to evaluate the theoretical correlation tensor components, $S_{1,\kappa}(v_p)$, and the one obtained by the estimation of the simulations, $S_{1,\kappa\_sin}(v_p)$, which represent the Doppler frequency correlation statistics related to the other eigenfunctions for the NSSF shown in FIG. 14.
Figure 16A:
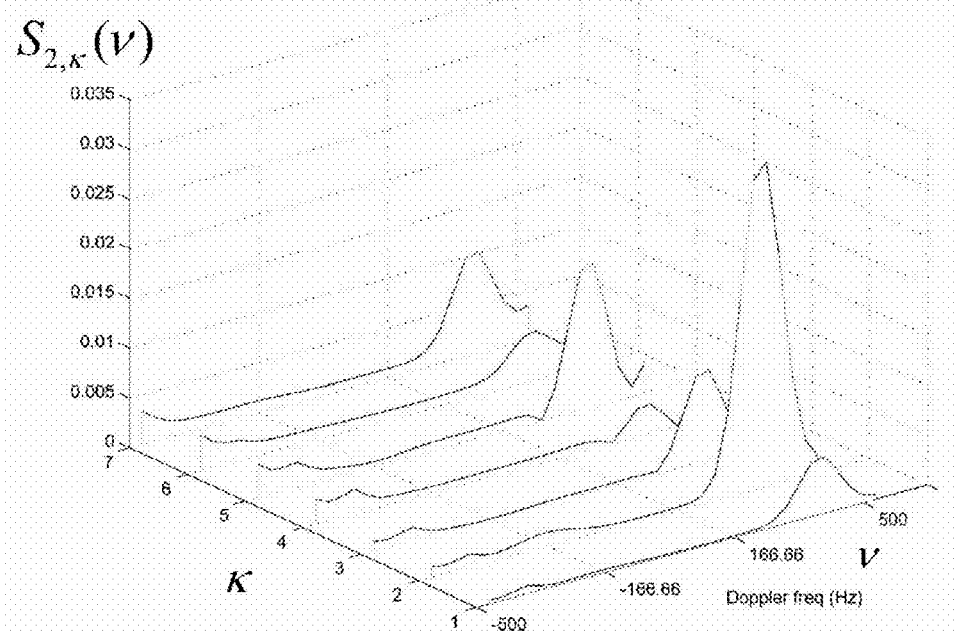
FIG. 16a shows the correlation functions in the Doppler domain, of the second eigenfunction in relation to the other eigenfunctions, same that show the theoretical functions, $S\_(2,\kappa)$ $(v\_p)$, and the estimated of the simulations, $S\_(2, \kappa\_sim)$ $(v\_p)$, for the NSSF shown in FIG. 14.
Figure 16B:
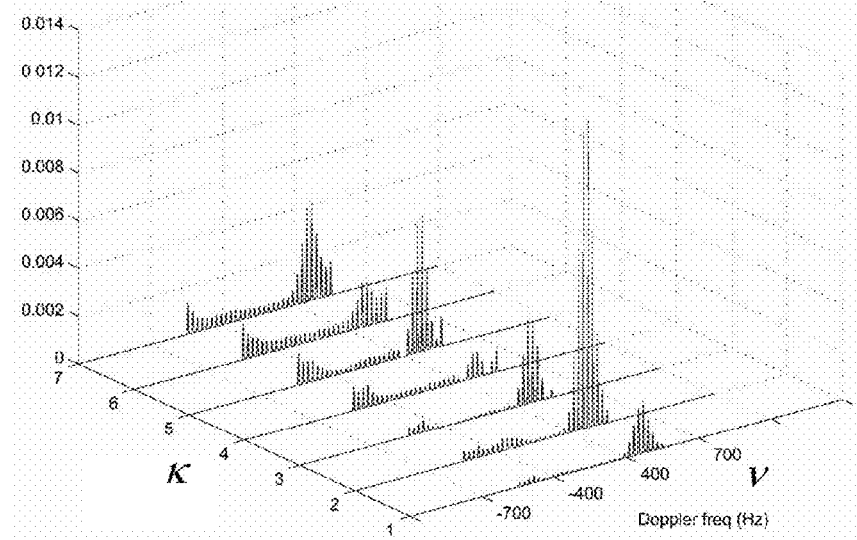
FIG. 16b shows the correlation functions in the Doppler domain, of the second eigenfunction in relation to the other eigenfunctions, same that show the theoretical functions, $S_{2,\kappa}(v_p)$, and the estimated of the simulations, $S_{2,\kappa\_sim}(v_p)$, for the NSSF shown in FIG. 14.

FIGS. 15a and 15b show the comparison of the results provided by the evaluation of the theoretical correlation tensor and the ones obtained by the estimation of the simulations, according to the statistics of the first universal eigenfunction and its correlation Doppler frequency according to the other eigenfunctions obtained through the universal correlation $R_U(\tau,\xi)$, considering an expansion of a channel that has the NSSF shown in FIG. 14. For this, in the FIG. 15a $S_{1,\kappa}(v)$ is graphed, where $S_{1,1}(v)$ represents the DPSD of the first universal eigenfunction, while the remaining $\kappa-1$ functions represent the crossed DPSD between the 1st and the κ-th. Moreover, FIG. 15b represents the estimated tensor, $S_{1,\kappa\_sim}(v_p)$, obtained by getting the average of the correlation statistics of 10,000 channel realizations generated with the proposed method, that on the example consisted of $L_{min}$=7 stochastic processes $\zeta_\xi(t)$, and where the realization of each one of them is generated with the method of addition of cissoids.

Similar to FIGS. 15a and 15b, FIGS. 16a and 16b show the correlation functions, on the Doppler domain, of the second eigenfunction according to the other eigenfunctions, same that show the theoretical functions, $S_{2,\kappa}(v_p)$, and the estimated of the simulations, $S_{2,\kappa\_sim}(v_p)$, obtained in the same way from 10,000 realizations, for the NSSF shown in FIG. 14.

Figure 17A:
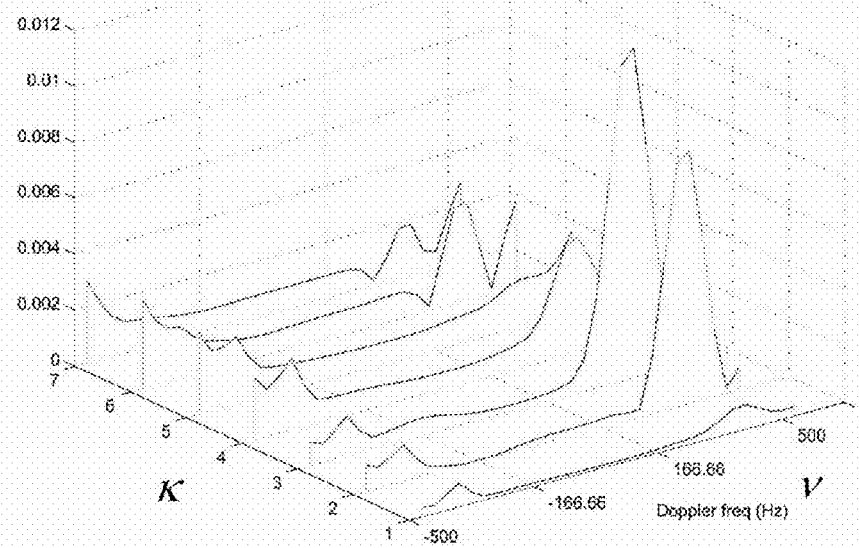
FIG. 17a shows the correlation functions on the Doppler domain, of the third eigenfunction in relation to the other eigenfunctions, same that show the theoretic functions, $S\_(3,\kappa)$ $(v\_p)$, and the estimated of the functions, $S\_(3, \kappa\_sim)$ $(v\_p)$, for the NSSF shown in FIG. 14.
Figure 17B:
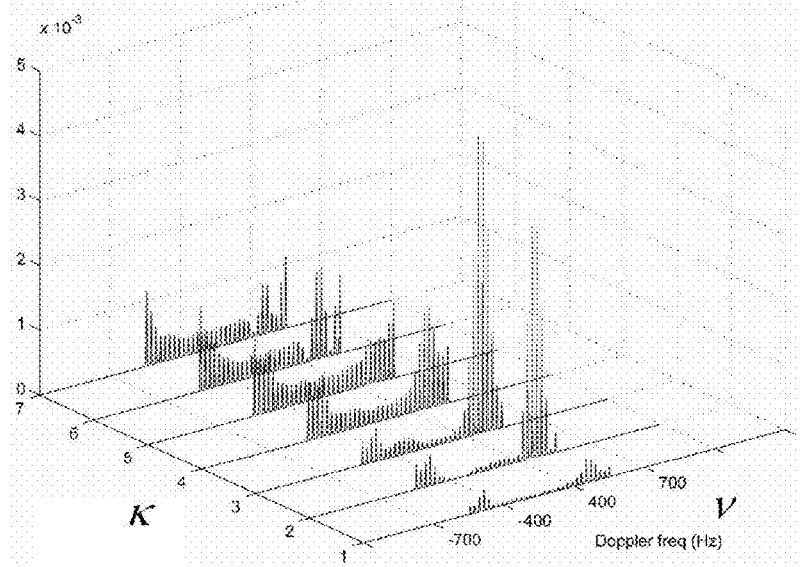
FIG. 17b shows the correlation functions on the Doppler domain, of the third eigenfunction in relation to the other eigenfunctions, same that show the theoretic functions, $S_{3,\kappa}(v_p)$, and the estimated of the functions, $S_{3,\kappa\_sim}(p)$, for the NSSF shown in FIG. 14.

FIG. 17a and FIG. 17b, show the correlation functions, on the Doppler domain of the third eigenfunction according to the other eigenfunctions, same that show the theoretical functions, $S_{3,\kappa}(v_p)$, and the estimated simulations, $S_{3,\kappa\_sim}(v_p)$, for the NSSF shown in FIG. 14.

Figure 18A:
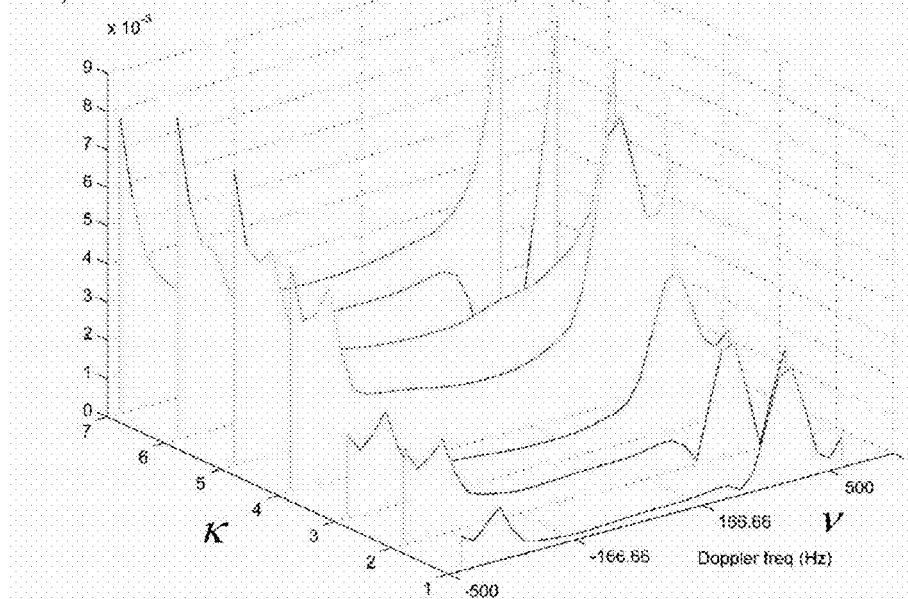
FIG. 18a shows the correlation functions on the Doppler domain, of the fourth eigenfunction in relation to the other eigenfunctions, same that show the theoretic functions, $S\_(4,\kappa)$ $(v\_p)$, and the estimated of the functions, $S\_(4, \kappa\_sim)$ $(v\_p)$, for the NSSF shown in FIG. 14.
Figure 18B:
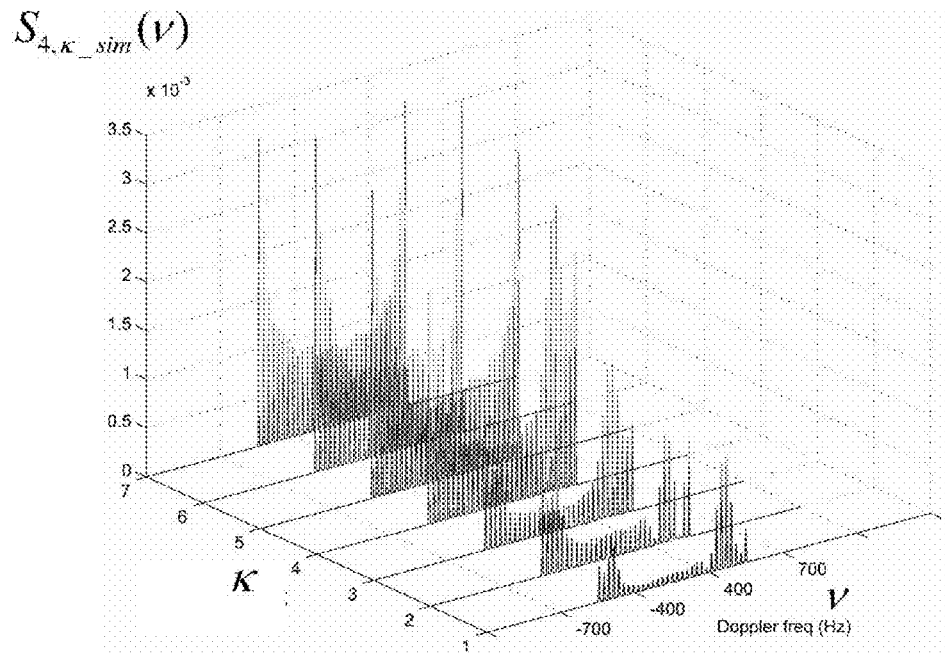
FIG. 18b shows the correlation functions on the Doppler domain, of the fourth eigenfunction in relation to the other eigenfunctions, same that show the theoretic functions, $S_{4,\kappa}(v_p)$, and the estimated of the functions, $S_{4,\kappa\_sim}(v_p)$, for the NSSF shown in FIG. 14.

FIGS. 18a and 18b show the correlation functions, on the Doppler domain of the fourth eigenfunction according to the other eigenfunctions, same that show the theoretical functions, $S_{4,\kappa}(v_p)$, and the estimated of the simulations, $S_{4,\kappa\_sim}(v_p)$, for the NSSF shown in FIG. 14.

Figure 19A:
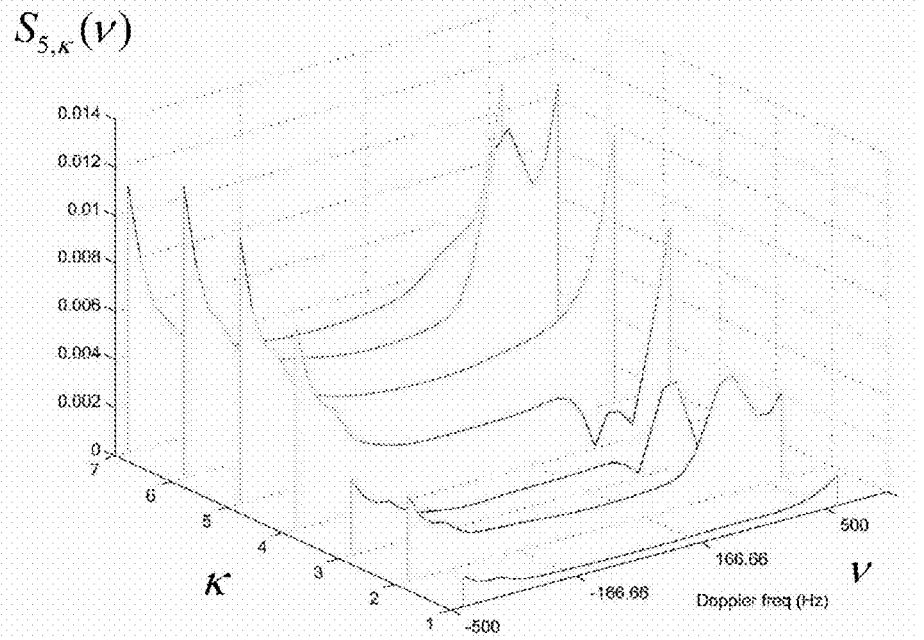
FIG. 19a shows the correlation functions on the Doppler domain, of the fifth eigenfunction in relation to the other eigenfunctions, same that show the theoretic functions, $S\_(5,\kappa)$ $(v\_p)$, and the estimated of the functions, $S\_(5, \kappa\_sim)$ $(v\_p)$, for the NSSF shown in FIG. 14.
Figure 19B:
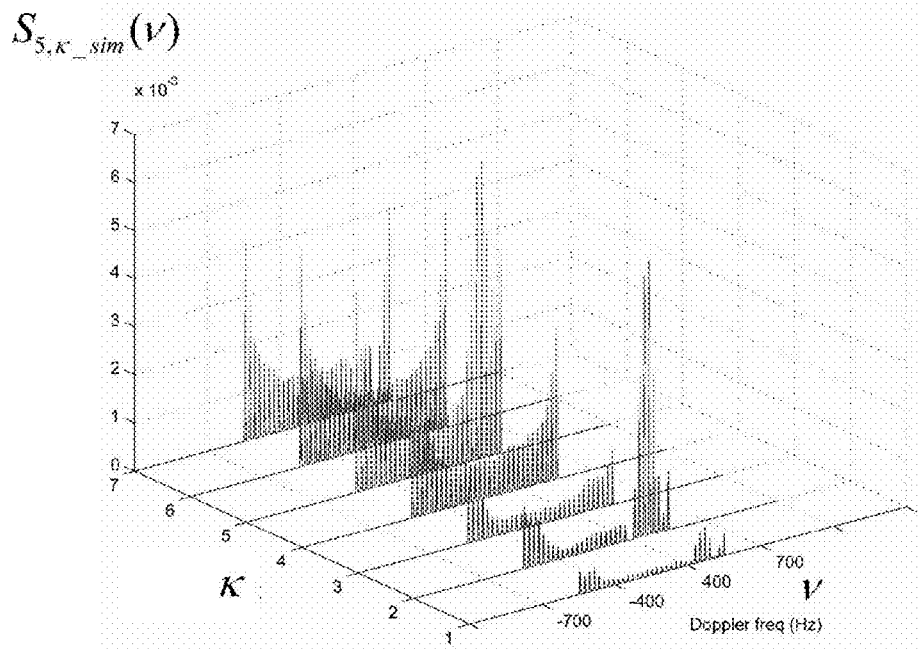
FIG. 19b shows the correlation functions on the Doppler domain, of the fifth eigenfunction in relation to the other eigenfunctions, same that show the theoretic functions, $S_{5,\kappa}(v_p)$, and the estimated of the functions, $S_{5,\kappa\_sim}(v_p)$, for the NSSF shown in FIG. 14.

FIGS. 19a and 19b show the correlation functions, on the Doppler domain of the fifth eigenfunction according to the other eigenfunctions, same that show the theoretical functions, $S_{4,\kappa}(v_p)$, and the estimated of the simulations, $S_{5,\kappa\_sim}(v_p)$, for the NSSF shown in FIG. 14.

Figure 20A:
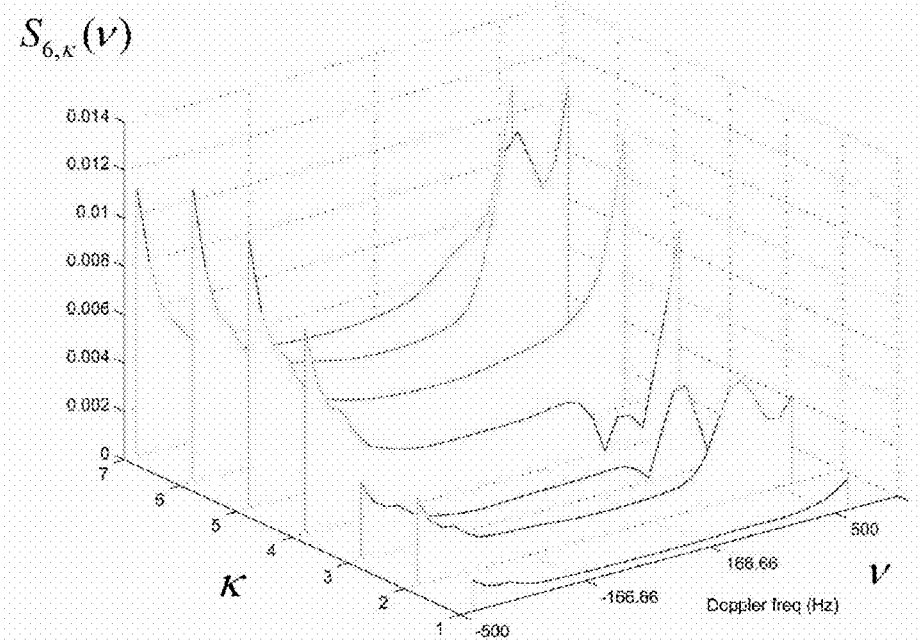
FIG. 20a shows the correlation functions on the Doppler domain, of the sixth eigenfunction in relation to the other eigenfunctions, same that show the theoretic functions, $S\_(6,\kappa)$ $(v\_p)$, and the estimated of the functions, $S\_(6, \kappa\_sim)$ $(v\_p)$, for the NSSF shown in FIG. 14.
Figure 20B:
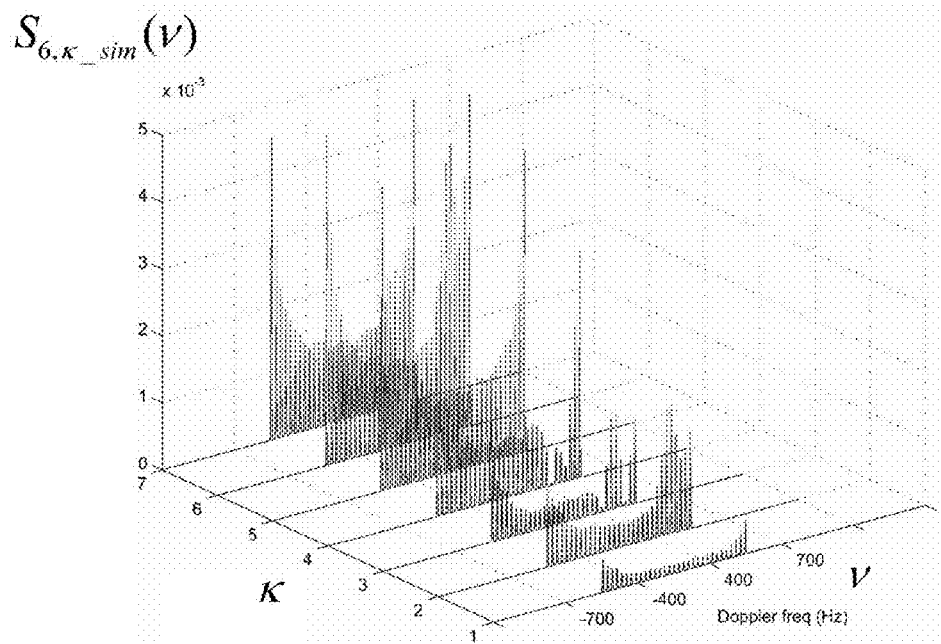
FIG. 20b shows the correlation functions on the Doppler domain, of the sixth eigenfunction in relation to the other eigenfunctions, same that show the theoretic functions, $S_{6,\kappa}(v_p)$, and the estimated of the functions, $S_{6,\kappa\_sim}(v_p)$, for the NSSF shown in FIG. 14.

FIGS. 20a and 20b show the correlation functions, on the Doppler domain of the sixth eigenfunction according to the other eigenfunctions, same that show the theoretical functions, $S_{6,\kappa}(v_p)$, and the estimated of the simulations, $S_{6,\kappa\_sim}(v_p)$, for the NSSF shown in FIG. 14.

Figure 21A:
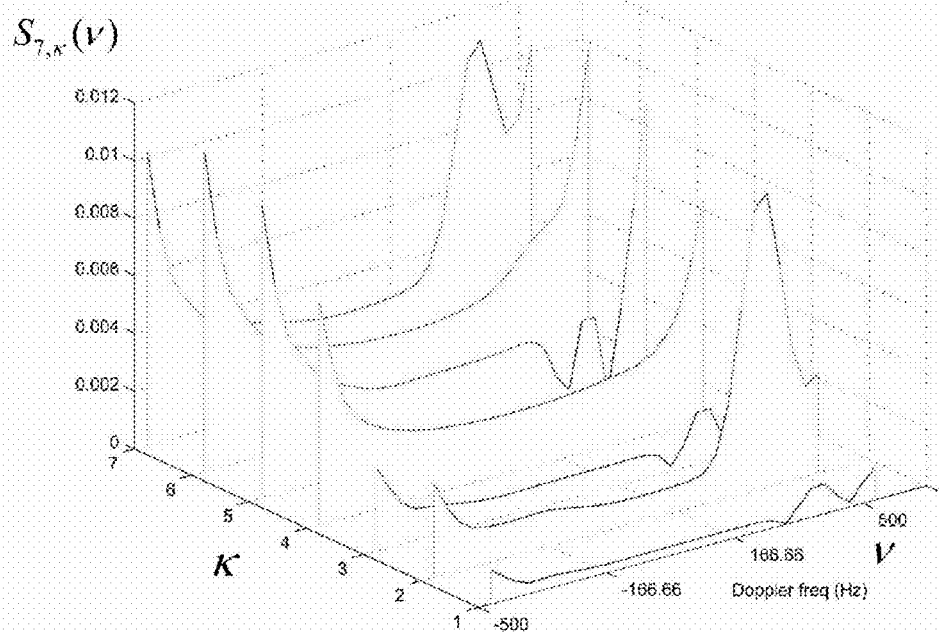
FIG. 21a shows the correlation functions on the Doppler domain, of the seventh eigenfunction in relation to the other eigenfunctions, same that show the theoretic functions, $S_{7,\kappa}(v_p)$, and the estimated of the functions, $S_{7,\kappa\_sim}(v_p)$, for the NSSF shown in FIG. 14.
Figure 21B:
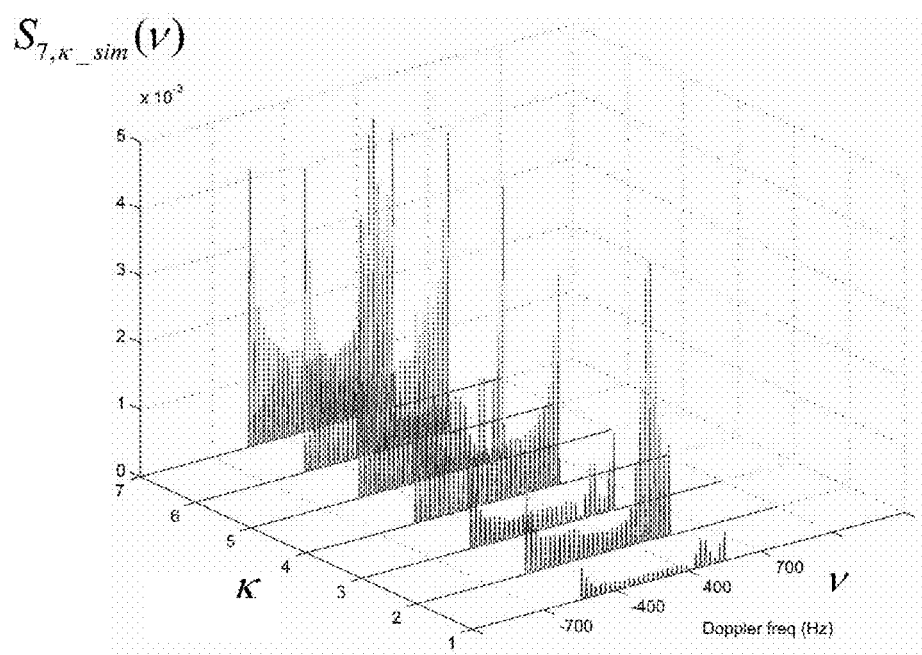
FIG. 21b shows the correlation functions on the Doppler domain, of the seventh eigenfunction in relation to the other eigenfunctions, same that show the theoretic functions, $S_{7,\kappa}(v_p)$, and the estimated of the functions, $S_{7,\kappa\_stim}(v_p)$, for the NSSF shown in FIG. 14.

FIGS. 21a and 21b show the correlation functions, on the Doppler domain of the seventh eigenfunction according to the other eigenfunctions, same that show the theoretical functions, $S_{7,\kappa\_sim}(v_p)$, for the NSSF shown in FIG. 14.

Figure 22A:
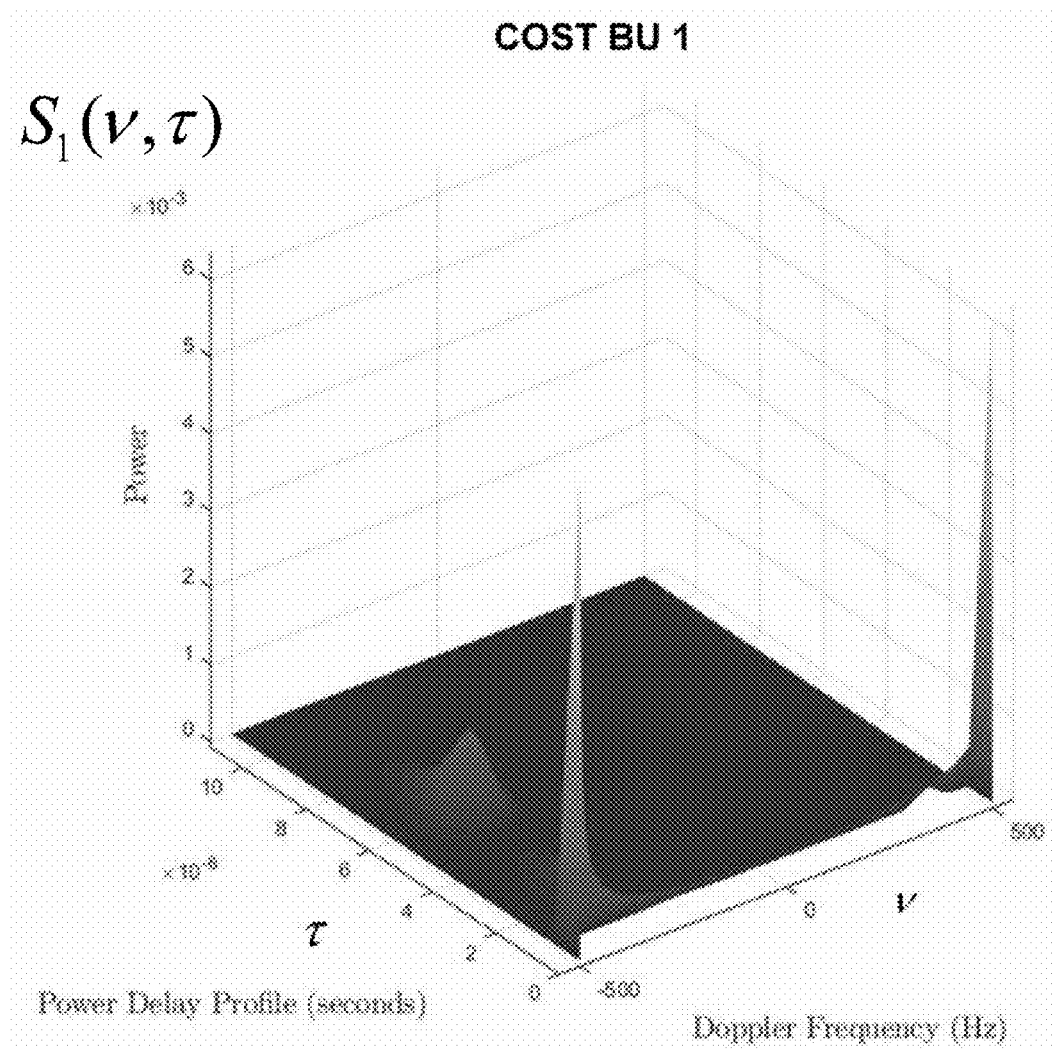
FIG. 22a shows two NSSF obtained from the DPSD considered in the COST-BU standard, $S_1(v,\tau)$ y $S_2(v,\tau)$ respectively, and that are used as an example to show the performance of the non-stationary channel emulator that is presented in this patent.
Figure 22B:
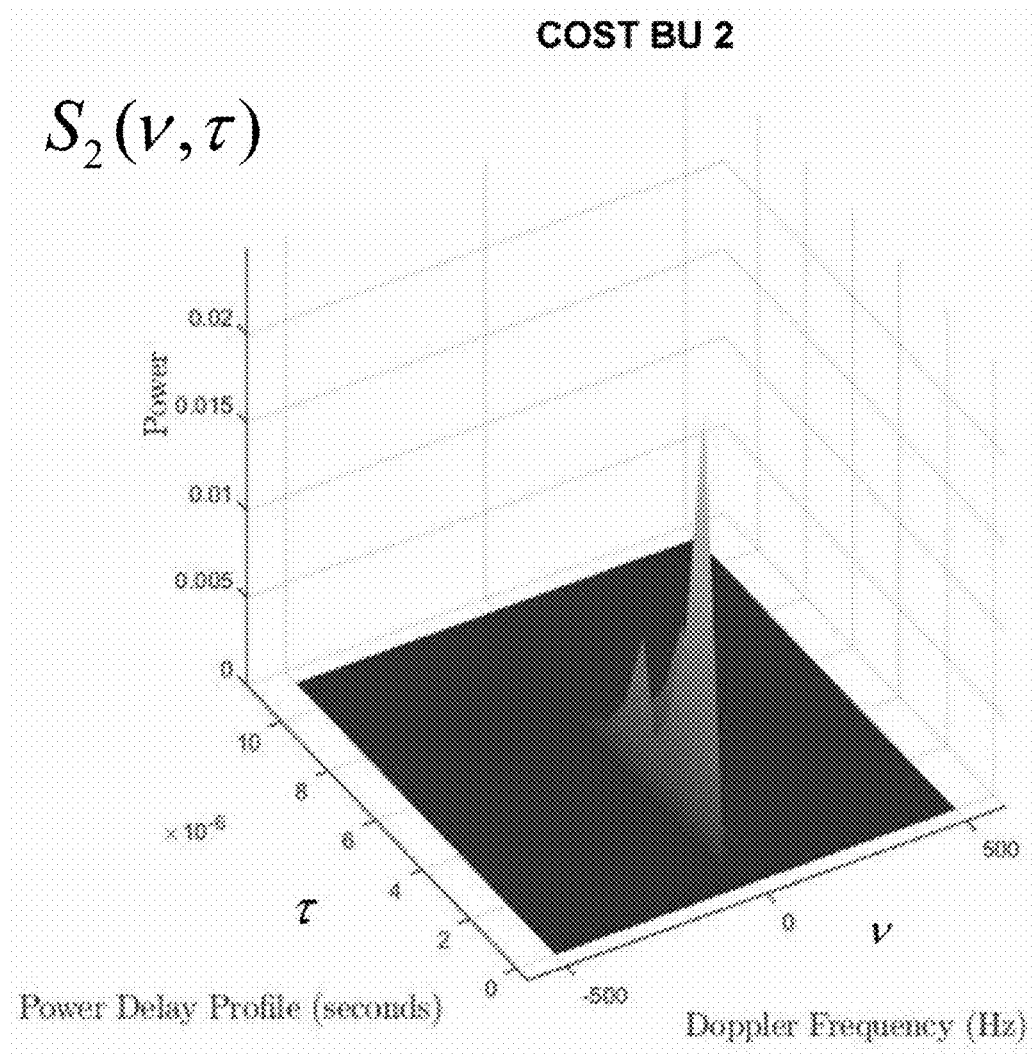
FIG. 22b shows two NSSF obtained from the DPSD considered in the COST-BU standard, $S_1(v,\tau)$ y $S_2(v,\tau)$ respectively, and that are used as an example to show the performance of the non-stationary channel emulator that is presented in this patent.

FIGS. 22a and 22b show two NSSF obtained from the DPSD considered on the COST-BU standard, $S_1(v,\tau)$ y $S_2(v,\tau)$ respectively, and that are used as an example to show the performance of the non-stationary channel emulator that is presented in this patent.

Figure 23A:
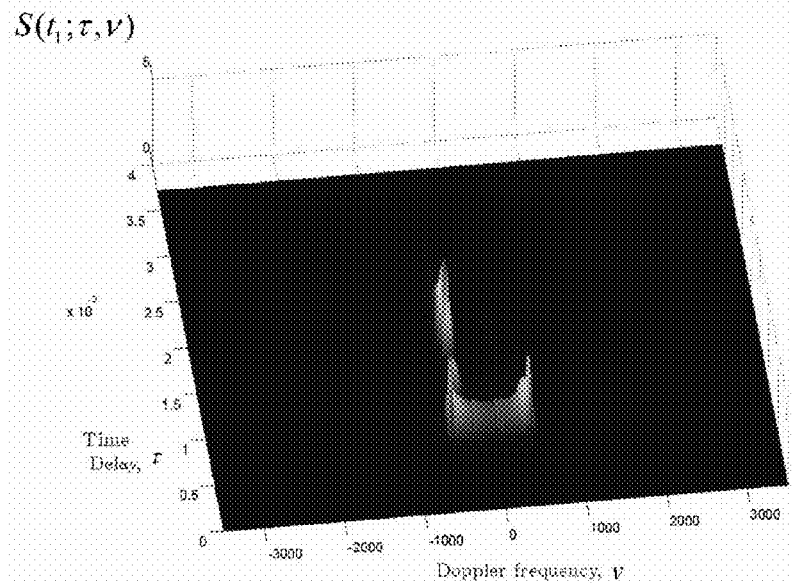
FIG. 23a shows the obtained statistics of the channel accomplishments through the proposed method, for different periods.
Figure 23B:
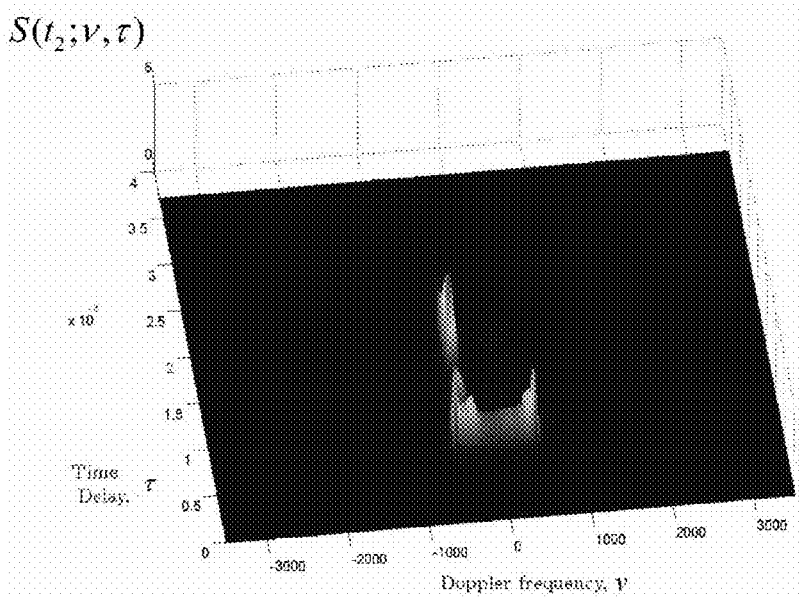
FIG. 23b shows the obtained statistics of the channel accomplishments through the proposed method, for different periods.
Figure 23C:
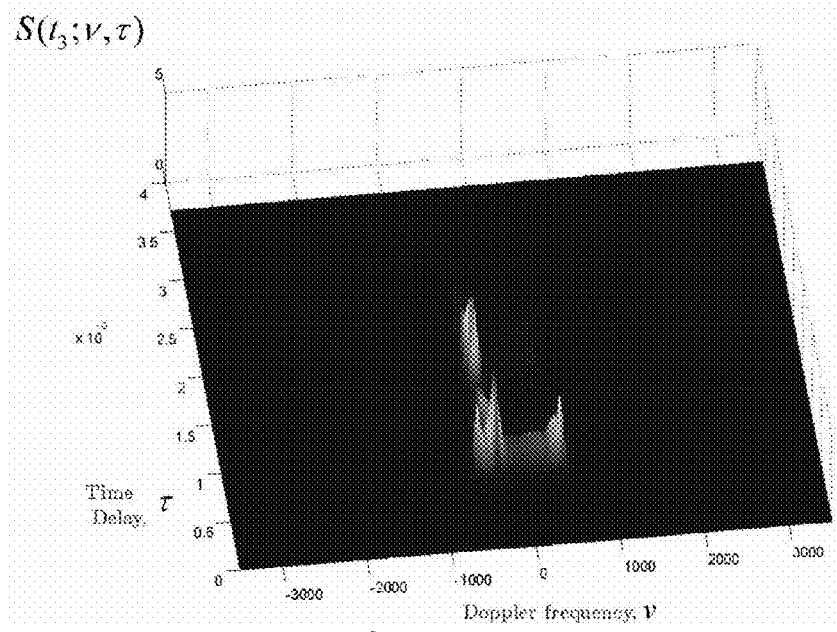
FIG. 23c shows the obtained statistics of the channel accomplishments through the proposed method, for different periods.
Figure 23D:
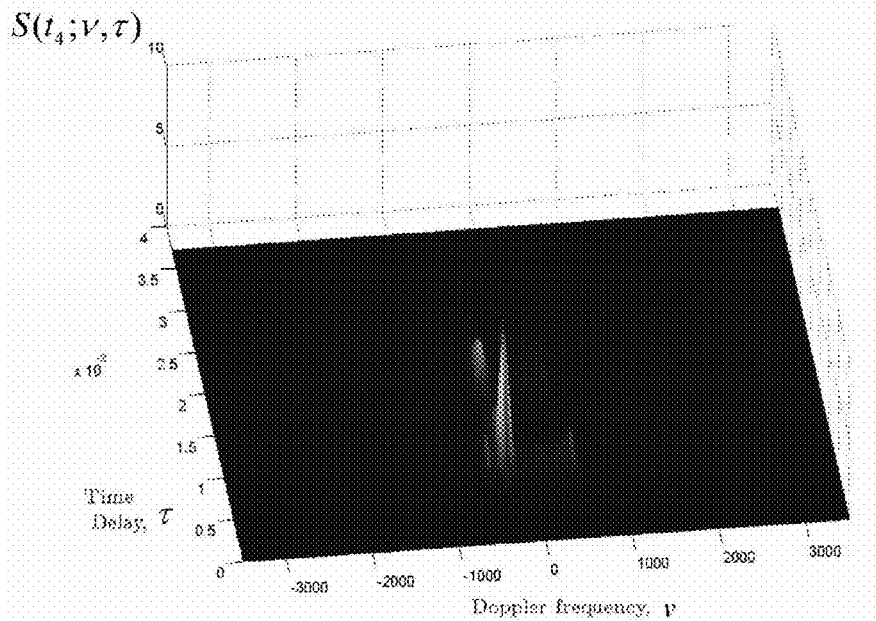
FIG. 23d shows the obtained statistics of the channel accomplishments through the proposed method, for different periods.
Figure 23E:
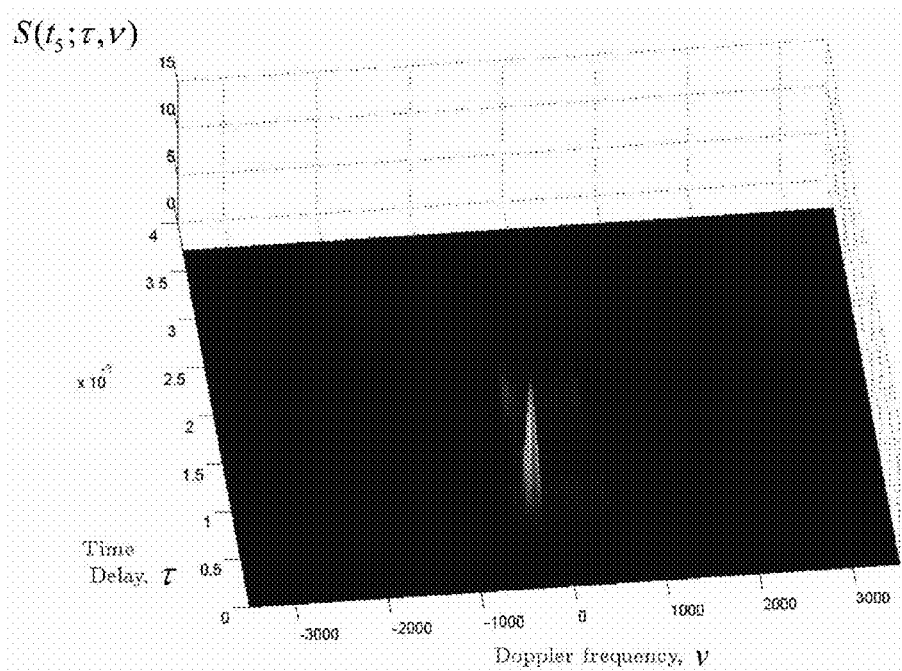
FIG. 23e shows the obtained statistics of the channel accomplishments through the proposed method, for different periods.

FIG. 23a, b, c, d, and e, show the statistics obtained from the channel realization through the proposed method, for different periods of time. The mentioned figures show the evolution of the NSSF since $S_1(v,\tau)$ until $S_2(v,\tau)$, which proves that the proposed method is capable of generating channel realizations with predefined statistics, even though these are NSSF and non-stationary.

Implementation of the Proposed Model of Channel Emulator.

FIG. 10 shows the general architecture of the doubly selective channel 1000 capable of emulating the defined characteristics by (II) via (V) and (VI) basing on the expressions (VII) to (XIII) and which implemented method consists of the obtained parameters by (XVI) and (XVII). The proposed architecture consists of five essential blocks 1001-1005, that in their group are used to generate a group of stationary and non-stationary stochastic processes with statistics that doubly dispersive channels, disperse in Doppler frequency and time of delay and with a non-separable dispersion function. The channel emulation scheme given by the apparatus 1000 allows to impregnate doubly selective distortions to an input signal $u(nT_s)$ original from the output of a transmitter device, having as a result a signal $r(nT_s)$ properly distorted with the statistics of a channel previously defined, as expressed in (I).

The general architecture 1000 described in FIG. 10 contains a machine of finite states that performs the general control of the architecture 1001 CNTL1. Which trough a group of essential signals such as "Data_conf_system", "Instruction", "Start", "Rst" y "Clk", perform the initialization processes of required parameters throughout the blocks of the general architecture 1000, as well as it determines the data processing for the correct generations of stochastic processes $\zeta_c(t)$ where c is defined from 1, 2, . . . , to $L_{min}$.

The block 1002 GENDC1 shown in FIG. 10, generates the required parameters for point i) from which any of the stationary or non-stationary cases mentioned on the Doubly selective channel simulation/emulation method, stationary or non-stationary in time of this patent, and that for the case of considering the generation of processes through sum of cissoids, performs the generation according to the equation (XVII), where the coefficients of the complex sinusoidal $c_p$ is obtained through random variables $\rho_p$, whose variance are determined according to the own values $\delta_p$. The coefficients $c_p$ for each Doppler frequency value $v_p$, are delivered to the module 1003 GENDPROC1 through the data bus "Coefficients $c_p$".

The module 1003 GENDPROC1 that implements $L_{min}$ generators of stochastic processes $\zeta_c(t)$ arbitrarily long with predefined correlation, as can be: the addition methods of sinusoidal/cissoids, expansion in orthogonal bases, filtering method, inverse Fourier transformation, etc. For the case in which the generators of the stochastic processes $\zeta_c(t)$ implement the method of the sum of Sinusoidal functions in (XVIII), requires realizations of the coefficients of the complex sinusoidal functions $c_p$ to each value of Doppler frequency $v_p$. It is very important to emphasize that the generation of stochastic processes $\zeta_c(t)$ is of arbitrary length because it uses the windowing scheme in the patent "Method And System For Generating Stationary And Non-Stationary Channel Realisations Of Arbitrary Length".

The module 1004 OPMULTINTER1 multiplies the stochastic processes $\zeta_c(t)$ generated by the module 1003 GENDPROC1, with the group of considered base functions, according to the points e) from Case I and f) from Case II from the section Doubly selective channel simulation/emulation method, stationary or non-stationary in time of this patent. For the stationary case, the module OPMULTINTER1 uses the group of universal functions $\psi_c(\tau)$ defined as stablished in point e) from Case I. Considering the non-stationary generation of channels, module OPMULTINTER1 multiplies the stochastic processes $\zeta_c(t)$, within a group of basis functions obtained according to point f) from Case II, in this case a group of universal functions $\zeta_c(\tau)$ capable of expanding the K dispersion functions $S(v,\tau)_k$ with k=1, 2, . . . , K. For both cases stationary or not, a scheme of interpolation is used for the expansion of the channel generated in (XIX) matches the sampling rate in which is found the input signal $u(nT_s)$ original from the output of a transmitter device, as seen in FIG. 10. In this way, the resulting processes $h_q[nT_s]$ for q=0, 1, 2, . . . , Q−1, are stochastic correlated products generated to the required sampling rates.

The module 1005 OPCONVCHNL1 performs the convolution operation of the input signal with the channel represented as a linear time varying filter, whose derivations are the resulting processes $h_q[nT_s]$ for q=0, 1, 2, . . . , Q−1, at a sampling rate defined by $\tau_s$ by the module 1004 OPMULTINTER1. The channel has the statistics of the predefined scattering function $S(v,\tau)$.

The generator module of the coefficients $c_p$ 1002 GENDC1 performs the periodical generation of the coefficients and the complex sinusoidal functions $c_p$ for each Doppler frequency value $v_p$. This given module is formed by 4 submodules that are shown in FIG. 11: 11021 GENRNDVAR1, 11022 MEMGEN-EIGENCOEF1, 11023 MULT-EIGENCOEF1 and 11024 TEMPMEM-CORRCOEF1. The initialization of the module GENDC1 (1002) is performed through the addressing of the parameterization data by the data bus "Data_conf_1", the addressing bus "Address", the enabler lines "Ena1, "Ena2" y "Ena3" such as the enabling writing/reading "W/R".

The submodule GENRNDVAR1 (11021) performs the random variable generation from the production of Gaussian variables $\rho_p$ to which a defined variance is applied by the corresponding own values $\delta_p$ from the structure ($\rho_p \odot$ sqrt ($\delta_p$)).

The submodule MEMGEN-EIGENCOEF1 (11022) stores the group of base functions or eigenfunctions $\beta_p$ obtained through the model in (XVI) and that are applied to the random variables $\rho_p$ to reproduce the parameters $c_p$. The storage and generation of the base functions is performed from the data bus "Data_conf_1" together with the control signals "W/R", "Address" and "Ena3".

The submodule MULT-EIGENCOEF1 (11023) performs the multiplication of the eigenfunctions $\beta_p$ with the random variables $\rho_p$ to reproduce the parameters $c_p$ according to the expression (XVII).

The submodule TEMPMEM-CORRCOEF1 (11024) is a block of temporal storage of the coefficients $c_p$ that were previously calculated.

FIG. 12 shows the architecture of the module GEND-PROC1 (1003) which contains $L_{min}$ generators (12000) of stochastic processes $\zeta_\zeta(t)$ arbitrarily long which are based on the method describe by (XVIII) and which implementation and function are based on the windowing scheme presented on the patent "Method And System For Generating Stationary And Non-Stationary Channel Realizations Of Arbitrary Length".

Statistical Results of the Generation of Channel Realizations from a Non-Separable Scattering Function, which is Intended to be Approximated by Applying the Method and Apparatus Proposed in the Present Patent.

In order to demonstrate the accuracy and quality of the channel realizations generated by the method and apparatus proposed in the present patent, a non-separable scattering function provided by the COST-BU standard is used as an example and is observed in FIG. 14. The parameters of the dispersion function consider a Doppler bandwidth of [−500 Hz, 500 Hz], a maximum delay value $\tau_{max}=10e-6$ seconds and a sample rate $F_s=1.35$ Mmuest/seg. Each realization of the sequences $x_{\zeta,i}(t)$ and $y_{\zeta,i}(t)$ were made with 31 windowed complex sinusoids by a duration function $T_{vent}=100$ ms.

From the universal correlation function like the one shown in FIG. 6, which uses the maximum delay value of the NSSF of FIG. 14 and the band-limited filter represented by a raised cosine function with total bandwidth of 675 kHz and excess bandwidth of 0.5. From this universal correlation function, universal orthogonal functions with $L_{min}=7$ functions were selected for the given channel parameters. These functions were used to expand a channel with NSSF of FIG. 14, which has been band-limited according to the equation (V). Subsequently, the projection of the channel is performed according to the equation (IX) and, the correlation tensor is calculated R($\Delta t$) and its Fourier transform to S(v).

FIGS. 15a, 16a, 17a, 18a, 19a, 20a and 21 show the correlational functions in the Doppler domain of the universal functions 1 to 7, respectively, according to the other eigenfunctions. That is, they present as a whole the functions that forms the reference correlation tensor, S(v). On the other hand, using the proposed method, 10,000 channel realizations are generated with the objective statistics and the correlation tensor obtained is estimated, whose integrating functions are shown in FIGS. 15b, 16b, 17b, 18b, 19b, 20b and 21b. Observing the figures, a high similarity obtained between the objective correlation tensor and that correlation tensor achieved through the emulation technique proposed in this patent can be appreciated.

Results Channel Realizations Generation of a Non-Stationary Non-Separable Dispersion Function.

On the other hand, to demonstrate the versatility of the method and apparatus for the simulation/emulation of non-stationary channels presented in this patent, five figures showing the continuous evolution of the existing dispersion in the channel are shown as an example. In FIGS. 23a, 23b, 23c, 23d and 23e, the evolution of the NSSF from $S_1(v,\tau)$ to $S_2(v,\tau)$ is shown, (these functions can be found in FIGS. 22a and 22b, respectively), which show that the proposed method is capable of generating channel realizations with predefined statistics, even if they are non-stationary and have an NSSF.

FIGS. 23a-e show the evolution of the NSSF from $S_1(v,\tau)$ up to $S_2(v,\tau)$, which proves that the proposed method is capable of producing channels with the predefined characteristics, even though they were NSSF and non-stationary.

The present invention has been described in its preferred embodiment, however, it will be apparent to those skilled in the art that a multiplicity of changes and modifications can be made to this invention, without departing from the scope of the following claims.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described about the embodiments disclosed herein may be implemented as electronic hardware, computer software, or combinations of both. To clearly illustrate this interchangeability of hardware and software, various illustrative components, blocks, modules, circuits, and steps have been described above in general terms of their functionality. Whether such functionality is implemented as hardware or software, depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, a given combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store a desired program code in the form of instructions or data structures and that may be accessed by a computer or processor. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other given configuration. Alternatively, some steps or methods may be performed by circuitry that is specific to a given function.

Any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be clear to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

REFERENCES

[REF1] R. H. Clarke, "A statistical theory of mobile-radio reception," Bell System Technical Journal, vol. 47, no. 6, pp. 957-1000, 1968.

[REF2] P. Bello, "Characterization of randomly time-variant linear channels," vol. 11, no. 4, pp. 360-393, December 1963.

[REF3] S. Rice, "Mathematical analysis of random noise," Bell System Technical Journal, vol. 23, pp. 282-232, 1944.

[REF4] P. Hoeher, "A statistical discrete-time model for the WSSUS multipath channel," IEEE Transactions on Vehicular Technology, vol. 41, no. 4, pp. 461-468, November 1992.

[REF5] M. Patzold, Mobile Radio Channels, 2nd ed. Wiley, November 2011. [REF6] J. Michels, P. Varshney, and D. Weiner, "Synthesis of correlated multichannel random processes," Signal Processing, IEEE Transactions on, vol. 42, no. 2, pp. 367-375, February 1994.

[REF7] C. Komninakis, "A fast and accurate Rayleigh fading simulator," in Proc. IEEE Global Telecommunications Conf. GLOBECOM '03, vol. 6, 2003, pp. 3306-3310.

[REF8] K.-W. Yip and T.-S. Ng, "Karhunen-Loeve expansion of the WSSUS channel output and its application to efficient simulation," Selected Areas in Communications, IEEE Journal on, vol. 15, no. 4, pp. 640-646, May 1997.

[REF9] R. Parra-Michel, V. Y. Kontorovitch, and A. G. Orozco-Lugo, "Modeling wide band channels using orthogonalizations," IEICE TRANSACTIONS on Electronics, vol. E85-C, no. 3, pp. 544-551, March 2002.

[REF10] R. Parra-Michel, V. Kontorovitch, and A. Orozco-Lugo, "Simulation of wideband channels with non-separable scattering functions," in Proc. IEEE International Conference on Acoustics, Speech, and Signal Processing (ICASSP '02), vol. 3, 13-17 May 2002, pp. 2829-2832.

[REF11] V. Kontorovich, S. Primak, A. Alcocer-Ochoa, and R. Parra-Michel, "MIMO channel orthogonalisations applying universal eigenbasis," IET Signal Processing, vol. 2, no. 2, pp. 87-96, 2008.

[REF12] A. Papoulis, Probability Random Variables, and Stochastic Processes. New York: McGraw-Hill, 1965.

The invention claimed is:

1. A method in an apparatus of a Double-selective channel emulator, stationary or non-stationary in time, with non-separable scattering function, implemented by a signal processor determined for the case of a stationary process, comprising:

a) defining one or a plurality of scattering functions, $S(v,\tau)$ inherent in the channel $c_{bb}(t;\tau)$, b) determining one or a plurality of a bandlimited filter $g(\tau)$ according to the a maximum bandwidth of the signals to be transmitted, c) obtaining the a bandlimited channel by convolving the channel with the band-limited filter:

$$h_{bb}(t;\tau) = c_{bb}(t;\tau) * g(\tau),$$

d) obtaining one or a plurality of universal correlation functions $R_U(\tau,\xi)$ from the steps of
  i. defining a maximum delay time $\tau_{max}$
  ii. generating one or a plurality of two-dimensional profile that fulfills with the principle of expansion of time-limited correlation functions subspaces, said generation step comprising using a universal two-dimensional profile defined by the information of the maximum delays as:

$$P_U(\tau,\xi) = \delta(\tau-\xi),\ \tau,\xi \in \{0,\tau_{max}\},\text{ and}$$

iii. generating a universal correlation function via $$R_U(\tau,\xi) = \int_{-\infty}^{\infty}\int_{-\infty}^{\infty} P_U(\tau,\xi)g(\tau)g(\xi)d\tau d\xi$$

e) obtaining a set of functions and their corresponding weights of the correlation function $R_U(\tau,\xi)$ from some matrix factorization technique, such technique selected from a group comprising a factorizations Cholezky, LU, $LDL^T$, and QR, that allows expanding the function of correlation $R_U(\tau,\xi)$, where the decomposition of eigenvalues and eigenvectors of $R_U(\tau,\xi)$ is used, f) starting from a certain threshold of permissible error in an approximation, which is given by a relative power of the eigenvalues, choose the $\zeta=1, 2, \ldots, L_{min}$ universal eigenfunctions, $\psi_\zeta(\tau)$, and universal eigenvalues, $\lambda_\zeta$, which represents processes with an error less than or equal to the one established in the threshold g) obtaining a correlation function of the channel $R_{h_{bb}}(\Delta t; \tau,\xi)$ via $$R_{h_{bb}}(t,s;\tau,\xi)=E\{h_{bb}(t;\tau)h^*_{bb}(s;\xi)\}=, \text{ with } \Delta t=s-t$$

h) using a universal functions, orthogonalize the correlation function $R_{h_{bb}}(\Delta t;\tau,\xi)$ in a time delay domains, to obtain tensor $R(\Delta t)$ of dimension $L_{min} \times L_{min}$ in variables of time delay, whose components $\{R(\Delta t)\}_{\zeta,\kappa}=R_{\zeta,\kappa}(\Delta t)$ are obtained from $$R_{\zeta,\kappa}(\Delta t)=\int_{-\infty}^{\infty}\int_{-\infty}^{\infty}R_{h_{bb}}(\Delta t;\tau,\xi)\psi_\zeta(\tau)\psi_\kappa(\xi)d\tau d\xi,$$

i) generating one or a plurality of set of stochastic processes $\zeta_\zeta(t)$ that are arbitrarily long, and whose autocorrelation and cross-correlation functions are given by $R(\Delta t)$ wherein the approach is carried out in a first step that is characterized by: 1) Generating one or a plurality of stochastic processes $x_{\zeta,l}(t)$ for $\zeta=1, 2, \ldots, L_{min}$, and $l=1, 2, \ldots, L$, according to a process generation method stochastics, such method comprising adding sinusoids/cisoids, expansion in orthogonal basis functions, filtering method, inverse Fourier transform, and other methodology; wherein each value l corresponds to the simulation/emulation time $T_{vent}$ of the processes $x_{\zeta,l}(t)$ and $y_{\zeta,l}(t)$ for $\zeta=1, 2, \ldots, L_{min}$; the processes $x_{\zeta,l}(t)$ and $y_{\zeta,l}(t)$ which have the same correlation and cross-correlation statistics as processes $\zeta_\zeta(t)$, but observed only during one time window $T_{vent}$, and $$l*T_{vent}-\frac{T_{vent}}{2} \leq t < l*T_{vent}+\frac{T_{vent}}{2}, \; l=1, 2, \ldots, \infty$$

2) generating stationary and non-stationary channel realizations of arbitrary length wherein the sequences $x_{\zeta,l}(t)$ and $y_{l,\zeta}(t)$ are weighted by a window $w(t)$ of duration $T_{vent}$ for each value of l and offset from a uniform random variable $\alpha$ whose value will remain constant for $l=1, 2, \ldots, \infty$, and where $x_{\zeta,l}(t)$ will also be out of phase $T_{vent}/2$, and later added to generate the $L_{min}$ arbitrarily long stochastic processes $\zeta_\zeta(t)$, and starting with a further step, the realizations of the processes $x_{\zeta,l}(t)$ is generated by sum of cisoids, to determine the weights and frequencies of these cisoids for each of the processes, and assuming that a tensor $R(\Delta t)$, where the processes are jointly stationary, implies that the tensor $S(v)$ consists of jointly decorrelated processes in the dual domain (in this case the Doppler frequency), wherein the next steps are performed:

i. obtaining the Doppler tensor $S(v)$ by means of the Fourier transform of $R(\Delta t)$ with respect to the variable $\Delta t$;

ii. discretizing $S(v)$ to obtain $S(v_p)$ from some method or scheme of integration of functions, wherein the discretization is defined by integrating it into certain centroids of frequency $v_p$; namely, $v_p=p\Delta_v$, and where $\Delta_v$ is the integration interval, i.e.:

$$\int_{p-\Delta v/2}^{p+\Delta v/2}S(v)dv=S(v_p),$$

and p is an integer variable supported by $P_1 \leq p < P_2$, wherein the discretized frequency correlation tensor, $S(v_p)$ is seen as a composition of correlation matrices, where for a value of $v_p$ we have a matrix $M_p$, and iii. factorizing each of the $M_p$ matrices using a matrix factorization technique selected from a group comprising Cholezky, LU, $LDL^T$, and QR, and using the algorithm of eigenvalues and eigenvectors, thus giving the following solution:

$$M_p=\beta_p \cdot \phi_p \cdot \beta_p^H, \text{ and}$$

iv. obtaining a set of correlated random variables from the method chosen in the previous paragraph and wherein according to the eigen-decomposition method, the amplitude parameters of the complex sinusoids are obtained for each frequency value $v_p$, as described in the following expression:

$$c_p=\beta_p \cdot (\rho_p \odot \text{sqrt}(\delta_p)),$$

where $\delta_p$ is a vector obtained from the diagonal of $\phi_p$, $\rho_p$ is a vector of white Gaussian complex random variables of dimension $L_{min} \times 1$, and of variance=½ for real-complex dimension, and $c_{p,\zeta}=\{c_p\}_\zeta$ corresponds to the weight of one of the sinusoids that will make up a stochastic process, and v. wherein the set of variables $\{c_{P_1,\zeta}, \ldots c_{P_2,\zeta}\}$ with their respective frequencies $v_p$ are used to generate the realization of a process $x_{\zeta,l}(t)$ via:

$$x_{\zeta,l}(t) = \sum_{p=P_1}^{P_2} c_{p,\zeta} e^{j2\pi v_p t}, \; l=1, 2, \ldots, \infty,$$

and j) generating another process $y_{\zeta,l}(t)$ with a new realization of the variables $c_{p,\zeta}$, wherein processes $x_{\zeta,l}(t)$ and $y_{\zeta,l}(t)$ has realizations weighted by a window $w(t)$ of duration $T_{vent}$ for $\zeta=1, 2, \ldots, L_{min}$, and $l=1, 2, \ldots, \infty$, and k) summing the sequences $x_{\zeta,l}(t)$ and $y_{\zeta,l}(t)$, which have a phase offset from a uniform random variable $\alpha$ defined in the interval $$\left(-\frac{T_{vent}}{2}, \frac{T_{vent}}{2}\right],$$

whose value will remain constant for $l=1, 2, \ldots, \infty$, and where $x_{\zeta,l}(t)$ will also be out of phase $T_{vent}/2$, hence, it will be obtained $L_{min}$ sums of sequences, as corresponds to the index of the generated process $\zeta=1, 2, \ldots, L_{min}$, whereby arbitrarily long stochastic processes, $\zeta_\zeta(t)$, are generated with autocorrelation and correlation statistics predefined by $R(\Delta t)$ and with reduced complexity, and l) performing the expansion of the realization of the channel $\hat{h}_{bb}(t;\tau)$ with the set of basis functions $\psi_\zeta(\tau)$ chosen, as described below:

$$\hat{h}_{bb}(t;\tau) = \sum_{\varsigma=1}^{L_{min}} \zeta_\varsigma(t)\psi_\varsigma(\tau);$$

and m) sampling of the channel $\hat{h}_{bb}(t;\tau)$ with the sampling period $T_s$, to obtain the coefficients of a linear filter that varies over time, the derivations of which are the discrete processes $h_q[nT_s]$ for q=0, 1, 2, . . . , Q−1, and n) convolving the discrete channel with the signal of interest $u(t=nT_s)$ to obtain the output signal $r(t=nT_s)$.

2. A method using an apparatus configured for double-selective channel emulator, stationary or non-stationary in time, with non-separable scattering function, implemented by a signal processor determined, for the case of a Non-stationary channels, as recited in claim 1 configured to perform the steps of:

a) defining a finite number of K scattering functions, b) defining the K dispersion functions $S(v,\tau)_k$ with k=1, 2, . . . , K inherent to each channel $c_{bb}(t;\tau)_k$, c) determining one or a plurality of the bandlimited filter $g(\tau)$ according to the maximum bandwidth of the signals to be transmitted, d) obtaining the bandlimited channels by convolving the channel with the bandlimited filter, for each of the K dispersion functions to consider:

$$h_{bb}(t;\tau)_k = c_{bb}(t;\tau)_k * g(\tau),$$

e) defining a simulation/emulation time $Tsim_k$ of the K scattering functions, f) obtaining one or a plurality of the universal correlation function $R_U(\tau,\xi)$, to expand the channels of all the dispersion functions of interest, from:

i. defining a maximum of all maximum delays $\tau_{max}$ of the K scattering functions to consider, ii. generating one or a plurality of two-dimensional profile that complies with the principle of expansion of time-limited correlation functions subspaces, comprising using a universal two-dimensional profile defined by the information of the maximum delays as:

$$P_U(\tau,\xi) = \delta(\tau-\xi), \tau,\xi \in \{0,\max(\tau_{max})\}$$

iii. generating a universal correlation function using $$R_U(\tau,\xi) = \int_{-\infty}^{\infty}\int_{-\infty}^{\infty} P_U(\tau,\xi)g(\tau)g(\xi)d\tau d\xi$$

g) obtaining the set of functions and their corresponding weights of the correlation function $R_U(\tau,\xi)$, from a matrix factorization technique, said matrix factorization technique selected from a group comprising factorizations Cholezky, LU, $LDL^T$, and QR, that allows expanding the correlation function $R_U(\tau,\xi)$, and, h) from a certain threshold of permissible error in the approximation, which is given by the relative power of the eigenvalues, choosing the $\zeta=1, 2, \ldots, L_{min}$ eigenfunctions $\psi_\zeta(\tau)$ according to the set of basis functions selected that can represent processes with error less than or equal to the one established in a threshold, and i) for each NSSF considered, to obtain $R_{h_{bb}}(\Delta t;\tau,\xi)_k$, $R(\Delta t)_k$, $S(v)_k$, $S(v_p)_k$, $M_{p_k}$, $\beta_{p_k}$, $\phi_{p_k}$, $\rho_{p_k}$, $\delta_{p_k}$, $c_{p_k}$, according to claim 1 and, j) generating one or a plurality of K pairs of processes $x_{\zeta,l}(t)_k$ and $y_{\zeta,l}(t)_k$ using a defined stochastic process generation method recited in claim 1 that will have a duration $Tsim_k$ for k=1, 2, . . . , K, thereby determining a sum of sinusoids whose realizations of duration $T_{vent}$ of the processes $x_{\zeta,l}(t)_k$ and $y_{\zeta,l}(t)_k$, are defined by indices l=1, 2, . . . , $Lsim_k$, where $Lsim_k = Tsim_k/T_{vent}$, and, k) using a method And System For Generating Stationary And Non-Stationary Channel Realizations Of Arbitrary Length" which provides a method for the sequences $x_{\zeta,l}(t)_k$ and $y_{\zeta,l}(t)_k$ are weighted by a window w(t) for $\zeta=1, 2, \ldots, L_{min}$, and l=1, 2, . . . , $(\tau Tsim_k)/T_{vent}$, out of phase from a uniform random variable $\alpha$ whose value will remain constant for l=1, 2, . . . , ∞, and where $x_{\zeta,l}(t)$ also will be out of phase $T_{vent}/2$, and later summed to generate the arbitrarily long and non-stationary $L_{min}$ stochastic processes $\zeta_\zeta(t)$, l) expanding the realization of the channel $\hat{h}_{bb}(t;\tau)$ with the set of basis functions $\psi_\zeta(\tau)$, used as described below:

$$\hat{h}_{bb}(t;\tau) = \sum_{\varsigma=1}^{L_{min}} \zeta_\varsigma(t)\psi_\varsigma(\tau),$$

and m) sampling of the channel $\hat{h}_{bb}(t;\tau)$ with the sampling period $T_s$, to obtain the coefficients of a linear time-varying filter, whose derivations are the discrete processes $h_q[nT_s]$ for q=0, 1, 2, . . . , Q−1, and n) Convolving the discrete channel with the signal of interest $u(t=nT_s)$ to obtain the output signal $r(t=nT_s)$.

3. An apparatus of a double-selective channel emulator, stationary or non-stationary in time, with non-separable scattering function, implemented by a signal processor determined according to claim 2 and further comprising:

a) having one or a plurality of finite state machines CNTL1 that perform the general control of the architecture through essential signals "Data_conf_system", "Instruction", "Start", "Rst" y "Clk", for the initialization process of required parameters, and b) having one or a plurality of GENDC1 blocks that generate the coefficients according to clause i) of the claim 1, and for the case of the sum of complex sinusoids method, generates the coefficients $c_p$ from random variables $\rho_p$, wherein the variance of $\rho_p$ is determined from according to the eigenvalues $\delta_p$, where the coefficients $c_p$ for each Doppler frequency value $v_p$, are delivered to a module GENDPROC1 through a data bus "Coefficients $c_p$", and where this GENDC1 module is formed by:

i. one or a plurality of submodules GENRNDVAR1 that generate random variables from the production of Gaussian variables of unit variance $\rho_p$ to which a weight defined by the corresponding eigenvalues $\delta_p$ of the form $(\rho_p \odot sqrt(\delta_p))$ is applied, and ii. one or a plurality of submodules MEMGEN-EI-GENCOEF1 that store a set of basis functions or eigenfunctions $\beta_p$ obtained from the model in:

$$M_p = \beta_p \cdot \phi_p \cdot \beta_p^H$$

and they are applied to random variables $\rho_p$ to produce parameters $c_p$ wherein the storage and generation of basis functions is carried out from data bus "Data_conf_1" in conjunction of control signals "W/R", "Address" y "Ena3", and, iii. one or a plurality of submodules MULT-EIGEN-COEF1 that performs the multiplication of some eigenfunctions $\beta_p$ with random variables $\rho_p$ for producing the parameters $c_p$ according to the expression:

$c_p = \beta_p \cdot (\rho_p \odot \text{sqrt}(\delta_p))$, and iv. one or a plurality of submodules TEMPMEM-CORRCOEF1 for temporary storage of coefficients $c_p$, which will be used to generate stochastic processes using the method of sum of complex sinusoids:

$$x_{\varsigma,i}(t) = \sum_{q=P_1}^{P_2} c_{p,\varsigma} e^{j2\pi v_p t},$$

and, v. in the case of generation of non-stationary channels, block GENRNDVAR1 stores parameters $\delta_p$ of the K dispersion functions $S(v,\tau)_k$ with k=1, 2, ..., K according to subsection i) of claim 2 and MEMGEN-EIGENCOEF1 stores basis functions $\beta_p$ according to K scattering functions $S(v,\tau)_k$ with k=1, 2, ..., K according to clause i) of claim 2, and c) one or a plurality of modules GENDPROC1 that according to clauses i), j) and k) of the claim 1, and implements $L_{min}$ generators of stochastic processes comprising selecting a method from a group comprising of adding sinusoids/cisoides, orthogonal basis, filtering method, and inverse Fourier transform, and therefore i. generating the $L_{min}$ arbitrarily long stochastic processes $\zeta_\zeta(t)$ with predefined statistics by channel orthogonalization, ii. implementing a method of summing complex sinusoids of frequency $v_p$ and weights $c_{p,\zeta}$, and iii. performing a windowing scheme and change of phase of processes that form each $\zeta_\zeta(t)$, and d) one or a plurality of module OPMULTINTER1 that multiplies stochastic processes $\zeta_\zeta(t)$ generated with the basis function set $\psi_\zeta(\tau)$ by means of an interpolation scheme, the expansion of the generated channel $h_q[nT_s]$ coincides with the sampling rate at which an input signal $u(nT_s)$ is acquired, coming from the output of a transmitting device, and e) one or a plurality of the module OPCONVCHNL1 that convolves the processes $h_q[nT_s]$ with the input signal $u(t=nT_s)$, coming from the output of a transmitting device, resulting in a signal $r(t=nT_s)$, properly distorted with the statistics of a previously defined channel.

* * * * *